US009456333B2

(12) United States Patent
Sekaran et al.

(10) Patent No.: US 9,456,333 B2
(45) Date of Patent: Sep. 27, 2016

(54) CENTRALIZED ROUTING IN HYBRID NETWORKS

(71) Applicant: Microsoft Corporation, Redmond, WA (US)

(72) Inventors: Mahendra Sekaran, Sammamish, WA (US); Vijay Kishen Hampapur Parthasarathy, Sammamish, WA (US); Anish Desai, Bellevue, WA (US); Ramkumar Natarajan, Redmond, WA (US); Jeffrey Kay, Bellevue, WA (US); John Bruner, Bellevue, WA (US); Ray Froelich, Redmond, WA (US); Tript Singh Lamba, Bothell, WA (US); Bayo Olatunji, Seattle, WA (US); Amey Parandekar, Mercer Island, WA (US); Vishal Ghotge, Seattle, WA (US); Andrew Peter Schoorl, Redmond, WA (US); Eugen Pajor, Newcastle, WA (US); Shaun Pierce, Bellevue, WA (US); Dhigha Sekaran, Redmond, WA (US); Frank Stephen Serdy, Jr., Sammamish, WA (US); John Skovron, Bellevue, WA (US); Reid Kuhn, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/327,314

(22) Filed: Jul. 9, 2014

(65) Prior Publication Data

US 2016/0014591 A1    Jan. 14, 2016

(51) Int. Cl.
*H04W 8/02* (2009.01)
*H04W 12/00* (2009.01)
(Continued)

(52) U.S. Cl.
CPC ............. *H04W 8/02* (2013.01); *H04M 7/0075* (2013.01); *H04M 7/1285* (2013.01);
(Continued)

(58) Field of Classification Search
CPC ........... H04L 65/1069; H04L 65/1053; H04L 65/1016; H04L 65/1006; H04L 65/104; H04L 65/403; H04L 12/5695; H04M 3/42314; H04M 2203/1091; H04M 7/006; H04Q 2213/1307; H04Q 2213/13098; H04Q 2213/13091

See application file for complete search history.

(56) References Cited

U.S. PATENT DOCUMENTS 6,148,206 A    11/2000 Karanja et al.
6,335,927 B1 *  1/2002 Elliott et al. .................. 370/352
(Continued)

FOREIGN PATENT DOCUMENTS

CA    2009887 A1 * 12/2008 ........ H04M 3/42314
CN    101656922 A     2/2010
(Continued)

OTHER PUBLICATIONS

Whitwam, Ryan, "Republic Wireless Moto X Review: A Great Deal with Very Few Compromises", Published on: Dec. 4, 2013, Available at: http://www.androidpolice.com/2013/12/03/republic-wireless-moto-x-review-a-great-deal-with-very-few-compromises/ (12 pages total).

(Continued)

*Primary Examiner* — Matthew Sams
(74) *Attorney, Agent, or Firm* — Miia Sula; Judy Yee; Micky Minhas

(57) ABSTRACT

A mobile device utilizes a two-stage dialing solution when roaming on a visited mobile operator (MO) network to implement centralized routing so that a home network portion of a hybrid network is inserted into the path of outbound calls. A remote centralized routing (CR) service interoperates with a CR client on the mobile device. When a call is initiated to a remote party, the CR client calls into an arbitrary roaming routing number that is terminated in the home network. Once the call is connected between the mobile device and home network, the CR client sends a dialing string that includes a destination number of the remote party. The CR service calls the destination number and then bridges the calls to the mobile device and remote party to establish an end-to-end call path between the local and far ends of the call that traverses the home network.

20 Claims, 20 Drawing Sheets

(51) Int. Cl.
  *H04M 7/00*  (2006.01)
  *H04M 7/12*  (2006.01)
(52) U.S. Cl.
  CPC .... *H04W 12/00* (2013.01); *H04M 2203/1091* (2013.01); *H04M 2203/152* (2013.01); *H04M 2207/203* (2013.01); *H04M 2207/206* (2013.01)

(56) References Cited

U.S. PATENT DOCUMENTS

| | | |
|---|---|---|
| 6,343,220 B1 | 1/2002 | Van Der Salm |
| 6,490,449 B1 | 12/2002 | Thibert et al. |
| 6,518,957 B1 | 2/2003 | Lehtinen |
| 6,763,226 B1 | 7/2004 | McZeal, Jr. |
| 7,010,002 B2 | 3/2006 | Chow et al. |
| 7,110,750 B2 | 9/2006 | Oishi et al. |
| 7,411,911 B2 | 8/2008 | Huotari et al. |
| 7,483,984 B1 | 1/2009 | Jonker et al. |
| 7,631,270 B2 | 12/2009 | Cunningham et al. |
| 7,697,479 B2 | 4/2010 | Metke et al. |
| 7,706,291 B2 | 4/2010 | Luft et al. |
| 7,746,989 B2 | 6/2010 | Mazor |
| 7,796,998 B1 | 9/2010 | Zellner et al. |
| 7,830,863 B2 | 11/2010 | Biage et al. |
| 7,835,751 B2* | 11/2010 | Ibe ............... H04W 36/14 370/338 |
| 7,894,807 B1 | 2/2011 | Drennan |
| 7,903,794 B1 | 3/2011 | Bales et al. |
| 7,986,943 B2 | 7/2011 | Bumiller |
| 7,995,565 B2 | 8/2011 | Buckley et al. |
| 8,000,710 B2 | 8/2011 | Jagadeesan et al. |
| 8,032,122 B2 | 10/2011 | Sigmund et al. |
| 8,126,465 B2 | 2/2012 | Lu et al. |
| 8,155,084 B2 | 4/2012 | Long et al. |
| 8,254,986 B2 | 8/2012 | Russell |
| 8,670,405 B1 | 3/2014 | Lee |
| 8,976,950 B2* | 3/2015 | Kramarenko ..... H04M 3/42314 370/352 |
| 9,001,787 B1 | 4/2015 | Conant |
| 2002/0059453 A1 | 5/2002 | Eriksson et al. |
| 2002/0146000 A1 | 10/2002 | Jonsson et al. |
| 2003/0231759 A1* | 12/2003 | Bedingfield et al. .... 379/355.01 |
| 2004/0047339 A1 | 3/2004 | Wang et al. |
| 2004/0121761 A1 | 6/2004 | Tripathy et al. |
| 2004/0203607 A1 | 10/2004 | Satapathy |
| 2004/0240430 A1 | 12/2004 | Lin et al. |
| 2005/0070291 A1* | 3/2005 | Shi ............... 455/445 |
| 2005/0186960 A1* | 8/2005 | Jiang ............... H04L 29/06027 455/435.1 |
| 2005/0249196 A1 | 11/2005 | Ansari et al. |
| 2005/0286466 A1 | 12/2005 | Tagg et al. |
| 2006/0029049 A1 | 2/2006 | Kobayashi et al. |
| 2006/0030357 A1* | 2/2006 | McConnell ....... H04M 3/42314 455/554.1 |
| 2006/0045069 A1 | 3/2006 | Zehavi et al. |
| 2006/0121902 A1 | 6/2006 | Jagadeesan et al. |
| 2006/0133582 A1 | 6/2006 | McCulloch |
| 2006/0187900 A1 | 8/2006 | Akbar |
| 2006/0198360 A1 | 9/2006 | Biage et al. |
| 2006/0245413 A1 | 11/2006 | Skalecki et al. |
| 2007/0070948 A1 | 3/2007 | Kezys et al. |
| 2007/0081518 A1 | 4/2007 | Jain et al. |
| 2007/0083918 A1* | 4/2007 | Pearce ............... H04L 63/0428 726/5 |
| 2007/0086584 A1 | 4/2007 | Rossini |
| 2007/0197224 A1* | 8/2007 | Winkler ............... H04W 76/02 455/445 |
| 2007/0206568 A1* | 9/2007 | Silver ............... H04L 12/66 370/352 |
| 2007/0206571 A1* | 9/2007 | Silver ............... H04W 76/025 370/352 |
| 2007/0217366 A1 | 9/2007 | Sagi et al. |
| 2007/0263613 A1 | 11/2007 | Hara et al. |
| 2008/0026732 A1* | 1/2008 | Goldfarb ............... H04L 12/581 455/414.1 |
| 2008/0032695 A1 | 2/2008 | Zhu et al. |
| 2008/0056235 A1 | 3/2008 | Albina et al. |
| 2008/0096560 A1 | 4/2008 | Felske et al. |
| 2008/0102815 A1 | 5/2008 | Sengupta et al. |
| 2008/0113683 A1 | 5/2008 | Paas |
| 2008/0123625 A1 | 5/2008 | Buckley |
| 2008/0192900 A1* | 8/2008 | Liu .................................. 379/87 |
| 2008/0232352 A1 | 9/2008 | Terrill et al. |
| 2008/0242299 A1 | 10/2008 | Edwards |
| 2008/0254797 A1 | 10/2008 | Achtari et al. |
| 2008/0261603 A1* | 10/2008 | Sever ............... H04M 1/274566 455/445 |
| 2008/0279176 A1 | 11/2008 | Cheng |
| 2009/0003316 A1* | 1/2009 | Lee ............... H04L 12/5692 370/352 |
| 2009/0086937 A1 | 4/2009 | Horn et al. |
| 2009/0097450 A1 | 4/2009 | Wallis et al. |
| 2009/0141682 A1 | 6/2009 | Zou et al. |
| 2009/0191876 A1 | 7/2009 | Jain et al. |
| 2009/0233602 A1 | 9/2009 | Hughes |
| 2009/0249247 A1 | 10/2009 | Tseng |
| 2009/0285175 A1 | 11/2009 | Nix |
| 2009/0305732 A1 | 12/2009 | Marcellino |
| 2010/0080128 A1 | 4/2010 | Hovey et al. |
| 2010/0124897 A1* | 5/2010 | Edge ............................. 455/404.1 |
| 2010/0172323 A1 | 7/2010 | Rexhepi et al. |
| 2010/0172483 A1 | 7/2010 | Weiner |
| 2010/0226339 A1 | 9/2010 | Stephenson et al. |
| 2010/0246785 A1 | 9/2010 | Wang |
| 2010/0285785 A1 | 11/2010 | Wang |
| 2010/0304724 A1* | 12/2010 | Lawler ............... H04M 3/42 455/414.1 |
| 2010/0316199 A1 | 12/2010 | Martin, II |
| 2011/0044293 A1 | 2/2011 | Nagasawa |
| 2011/0103576 A1 | 5/2011 | Partington et al. |
| 2012/0014273 A1 | 1/2012 | Notton et al. |
| 2012/0115490 A1* | 5/2012 | Nicholson ........... H04M 3/4228 455/445 |
| 2012/0120914 A1 | 5/2012 | Sedlacek et al. |
| 2012/0140743 A1 | 6/2012 | Pelletier |
| 2012/0196644 A1* | 8/2012 | Scherzer et al. .............. 455/524 |
| 2012/0236868 A1 | 9/2012 | Yan |
| 2012/0282942 A1 | 11/2012 | Uusitalo |
| 2012/0296963 A1 | 11/2012 | Lu |
| 2013/0007286 A1 | 1/2013 | Mehta et al. |
| 2013/0035138 A1 | 2/2013 | Abbott |
| 2013/0064106 A1 | 3/2013 | Sylvain |
| 2013/0067056 A1 | 3/2013 | Purkayastha et al. |
| 2013/0100887 A1 | 4/2013 | Kim |
| 2013/0196653 A1 | 8/2013 | Morrison |
| 2013/0196706 A1 | 8/2013 | Patel et al. |
| 2013/0331101 A1* | 12/2013 | Thomas et al. ............. 455/435.1 |
| 2014/0068314 A1 | 3/2014 | Kim |
| 2014/0070991 A1 | 3/2014 | Liu |
| 2014/0254491 A1* | 9/2014 | Lindholm ........... H04L 65/1016 370/328 |
| 2014/0269495 A1 | 9/2014 | Frantz |
| 2015/0038156 A1 | 2/2015 | Kilpatrick, II |
| 2015/0065134 A1 | 3/2015 | Vandemoere et al. |

FOREIGN PATENT DOCUMENTS

| | | |
|---|---|---|
| EP | 1432219 A1 | 6/2004 |
| EP | 1519526 A1 | 3/2005 |
| EP | 1858270 A1 | 11/2007 |
| EP | 2009887 A1 | 12/2008 |
| EP | 2096843 A2 | 9/2009 |
| EP | 2112849 A2 | 10/2009 |
| EP | 2271171 A1 | 1/2011 |
| JP | 2002-262336 A | 9/2002 |
| WO | 0013454 A1 | 3/2000 |
| WO | 02/11475 A1 | 2/2002 |
| WO | 2004/057845 A1 | 7/2004 |
| WO | 2005055626 A1 | 6/2005 |
| WO | 2005101785 A1 | 10/2005 |
| WO | 2008110664 A1 | 9/2008 |

(56) References Cited

FOREIGN PATENT DOCUMENTS

| WO | 2009040645 A1 | 4/2009 |
|---|---|---|
| WO | 2013025698 A1 | 2/2013 |

OTHER PUBLICATIONS

Perenson, Melissa, "Republic Wireless: Everything You Need to Know", Published on: Aug. 28, 2013, Available at: http://blog.laptopmag.com/republic-wireless-faq (6 pages total).
"ip4calls-iTelHybridDialer", Published on: Jul. 17, 2013, Available at: https://play.google.com/store/apps/details? id=com.revesoft.hybriddialer.first_united_international_general_trading_.ip4calls&hl=en (2 pages total).
Whitwam, Ryan, "A Google Engineer Explains Why KitKat has White Status Bar Icons and Only Shows Connectivity in Quick Settings", Published on: Nov. 18, 2013, Available at: http://www.androidpolice.com/2013/11/18/a-google-engineer-explains-why-kitkat-has-white-status-bar-icons-and-only-shows-connectivity-in-quick-settings/ (9 pages total).
Ormond, et al., "Dynamic Network Selection in Wireless LAN/MAN Heterogeneous Networks", In Proceedings of Mobile WiMAX: Towards Broadband Wireless Metropolitan Area Networks, Dec. 10, 2007, (60 pages total).
Alkhwlani, et al., "Access Network Selection using Combined Fuzzy Control and MCDM in Heterogeneous Networks", In Proceedings of International Conference on Computer Engineering & Systems, Nov. 27, 2007, (6 pages total).
Porjazoski, et al., "Radio Access Technology Selection in Heterogeneous Wireless Networks Based on Service Type and User Mobility", In Proceedings of 18th International Conference on Systems, Signals and Image Processing, Jun. 16, 2011, (4 pages total).
Adamopoulou, et al., "Intelligent Access Network Selection in Heterogeneous Networks", In 2nd International Symposium on Wireless Communication Systems, Sep. 7, 2005, (5 pages total).
Alkhawlani, et al., "Hybrid Approach for Radio Network Selection in Heterogeneous Wireless Networks", In International Journal of Advanced Science and Technology, vol. 44, Jul. 2012, (16 pages total).
Cai, et al., "Dynamic and User-Centric Network Selection in Heterogeneous Networks", In Proceedings of IEEE International Performance, Computing, and Communications Conference, Apr. 11, 2007, (7 pages total).
Gharsellaoui, et al., "Optimizing Access Point Selection in Wireless Local Area Networks", In Proceedings of International Conference on Communications and Information Technology, Mar. 29, 2011, (6 pages total).
Jafry, et al., "Call Handoff Initiation in Hybrid Networks", U.S. Appl. No. 14/144,668, filed Dec. 31, 2013.
Calhan, et al., "An Adaptive Neuro-Fuzzy Based Vertical Handoff Decision Algorithm for Wireless Heterogeneous Networks", In IEEE 21st International Symposium Personal Indoor and Mobile Radio Communications, Sep. 26, 2010, (6 pages total).
Yan, et al., "A Survey of Vertical Handover Decision Algorithms in Fourth Generation Heterogeneous Wireless Networks", In Computer Networks: The International Journal of Computer and Telecommunications Networking, vol. 54, Issue 11, Aug. 2010, (16 pages total).
Liu, et al., "Performance Analysis and Optimization of Handoff Algorithms in Heterogeneous Wireless Networks", In IEEE Transactions on Mobile Computing, vol. 7, Issue 7, Jul. 2008, (12 pages total).
Wong, et al., "A Pattern Recognition System for Handoff Algorithms", In IEEE Journal on Selected Areas in Communications, vol. 18, Issue 7, Jul. 2000, (12 pages total).
Sidhu, et al., "Call Continuity", US Appl. No. 14/026,933, filed Sep. 13, 2013.
Kalmanek, et al., "A Network-Based Architecture for Seamless Mobility Services", In IEEE Communications Magazine, vol. 44, Issue 6, Jun. 2006 (7 pages total).

Salkintzis, et al., "Voice Call Handover Mechanisms in Next-Generation 3GPP Systems", In IEEE Communications Magazine, vol. 47, Issue 2, pp. 46-56, Feb. 2009 (11 pages total).
Voice Call Flow Overview, 2007 Cisco Systems, Inc., pp. 1-14, Retrieved from: http://www.cisco.com/en/US/docs/ios/voice/monitor/configuration/guide/vt_callflow_ov.pdf, Retrieved on: Jun. 17, 2013 (14 pages total).
J. Rosenberg, "Interactive Connectivity Establishment (ICE): A Protocol for Network Address Translator (NAT) Traversal for Offer/Answer Protocols", IETF Trust (Apr. 2010), Retrieved from: http://www.rfc-editor.org/rfc/rfc5245.txt, Retrieved on: Sep. 12, 2013 (110 pages total).
M. Baugher, et al., "The Secure Real-time Transport Protocol (SRTP)", The Internet Society (Mar. 2004), Retrieved from: http://www.rfc-editor.org/rfc/rfc3711.txt, Retrieved on: Sep. 12, 2013 (53 pages total).
J. Rosenberg, et al., "SIP: Session Initiation Protocol", The Internet Society (Jun. 2002), Retrieved from: http://www.rfc-editor.org/rfc/rfc3261,txt, Retrieved on: Sep. 12, 2013 (252 pages total).
H. Schulzrinne, et al., "RTP: A Transport Protocol for Real-Time Applications", The Internet Society (Jul. 2003), Retrieved from: http://www.rfc-editor.org/rfc/rfc3550.txt, Retrieved on: Sep. 12, 2013 (98 pages total).
Bryan, et al., "Sosimple: A SIP/Simple Based P2P VoIP and IM System," Computer Science Department, College a of William and Mary, Williamsburg, VA, Retrieved from: http://www.enseirb.fr/~kadionik/sip/paper, Retrieved Date: Sep. 16, 2013 (6 pages total).
Rauhala, J., "Universal SIP client for consumer devices," Helsinki University of Technology, Department of Electrical Communications Engineering, Thesis submitted May 13, 2003, Retrieved from: http://scholar.google.com/url?sa=U&q=http://antoine.fressancourt.free.fr/exjobb/BX_Universal, Retrieved Date: Sep. 16, 2013 (64 pages total).
Santos, et al., "Deployment of a Wireless Hybrid and Mobile Network for VoIP Services Based on Open Source Software," Universidade Federal de Campina Grande, Retrieved From: http:/www.inf.int-evry.fr/~olberger/wfs2006/danilo, Retrieved Date: Sep. 16, 2013 (20 pages total).
"Route to Home", Published on: Mar. 10, 2012, Available at: http://www.inovar.com/products/RouteToHome.html (1 page total).
"Smart Call Routing", Retrieved on: Dec. 31, 2013, Available at: http://www.roamware.com/downloads/datasheets/Smart%20Call%20Routing.pdf (2 pages total).
"Roaming Call Optimizer," Published on: Mar. 22, 2011, Available at: http://www.starhome.com/call-optimization.html (1 page total).
"Mobile Collaboration", Retrieved on: Dec. 31, 2013, Available at: http://www.cisco.com/en/US/docs/voice_ip_comm/cucm/smd/collab09/mobilapp.htmln (39 pages total).
"Optimal Call Routing", Retrieved on: Dec. 31, 2013, Available at: http://www.bics.com/content/ocr (2 pages total).
Bellavista, et al., "An IMS Vertical Handoff Solution to Dynamically Adapt Mobile Mulitmedia Services", IEEE Symposium on Computers and Communications, Jul. 6, 2008, pp. 764-771, 8 pages.
Achour et al., "Inter-Domain Mobility Management Solution for Service Continuity in IMS-Based Networks", IEEE Consumer Communications and Networking Conference, Jan. 14, 2012, pp. 559-564, 6 pages.
"International Search Report and Written Opinion Received for PCT Patent Application No. PCT/US2014/068685", Mailed Date: Feb. 11, 2015, 7 Pages.
"International Search Report and Written Opinion Issued in PCT Application No. PCT/US2015/39310", Mailed Date: Oct. 14, 2015, (10 Pages total).
"International Search Report and Written Opinion Issued in PCT Application No. PCT/US2015/028679", Mailed Date: Aug. 26, 2015, (11 Pages total).
"International Preliminary Report on Patentability Issued in PCT Application No. PCT/US2014/054633", Mailed Date: Aug. 21, 2015, 6 Pages total.
"International Search Report and Written Opinion Issued in PCT Patent Application No. PCT/US2015/020848", Mailed Date: Jun. 9, 2015, (11 Pages total).

(56) References Cited

OTHER PUBLICATIONS

"International Search Report & Written Opinion Received for PCT Application No. PCT/US2015/023453", Mailed Date: Jun. 22, 2015, (12 Pages total).
"International Preliminary Report on Patentability Issued in PCT Application No. PCT/US2014/068685", Mailed Date: Jun. 26, 2015, (6 Pages total).
Ryan Whitman, "A Google Engineer Explains Why KitKat Has White Status Bar Icons and Only Shows Connectivity in Quick Settings", available at <http://www.androidpolice.com/2013/11/18/a-goog le-eng ineer-explains-why-kitkat-has-wh ite-status-baricons-and-only-shows-connectivity-in-quick-settings/>, available on Nov. 18, 2013, (3 pages total).
"International Search Report and Written Opinion Issued in PCT Application No. PCT/US2015/056290", Mailed Date: Feb. 1, 2016, (15 Pages total).
"Second Written Opinion Issued in PCT Application No. PCT/US2015/023453", Mailed Date: Mar. 1, 2016, 6 Pages.
Second Written Opinion Issued in PCT Application No. PCT/US2015/020848, Mailed Date: Mar. 30, 2016, (7 pages total).
Corey Gunther, "What's this icon? Galaxy S4 notification bar icons explained", available on Jul. 9, 2013, available at <http://androidcommunity.com/whats-this-icon-galaxy-s4-notification-bar-icons-explained-20130709/>, (3 pages total).
designyourway.com, "User Interface Design Inspiration—45 Lovely Switches", avaible at <http://www.designyourway.net/drb/user-interface-desig n-inspiration-45-lovely-switches>, archived on 0712012013 at wayback machine <http://web.archive.org>, (16 pages total).
International Preliminary Report on Patentability issued in PCT Application No. PCT/US2015/023453, mailed date: Jun. 17, 2016 (10 pages total).
International Preliminary Report on Patentability Issued in PCT Application No. PCT/US2015/39310, Mailed Date: Jun. 2, 2016, (6 pages total).
International Preliminary Report on Patentability Issued in PCT Application No. PCT/US2015/020848, Mailed Date: Jun. 28, 2016, 8 pages.

\* cited by examiner

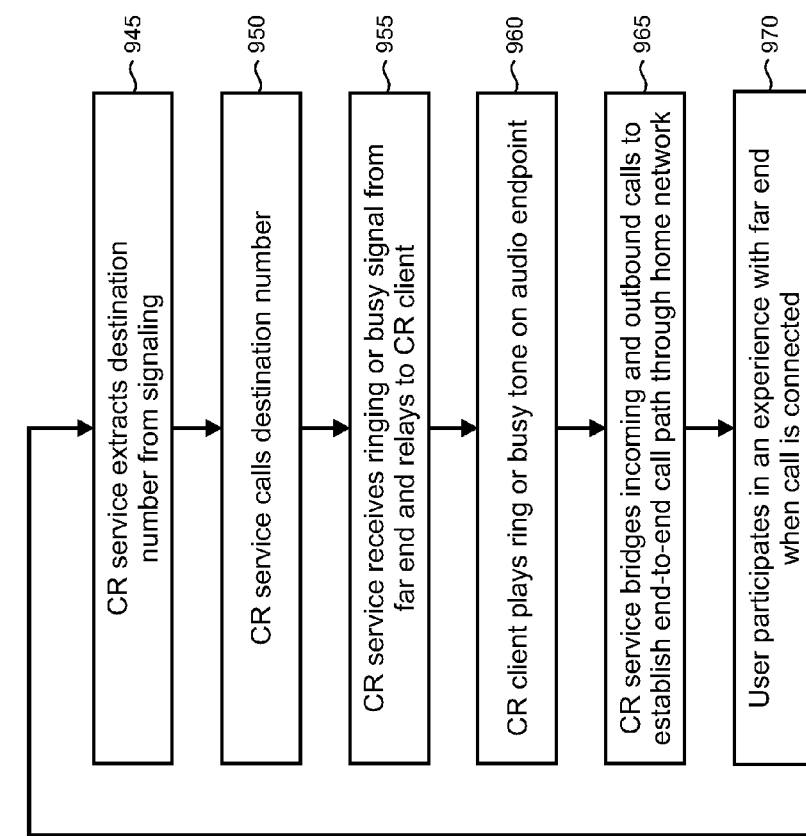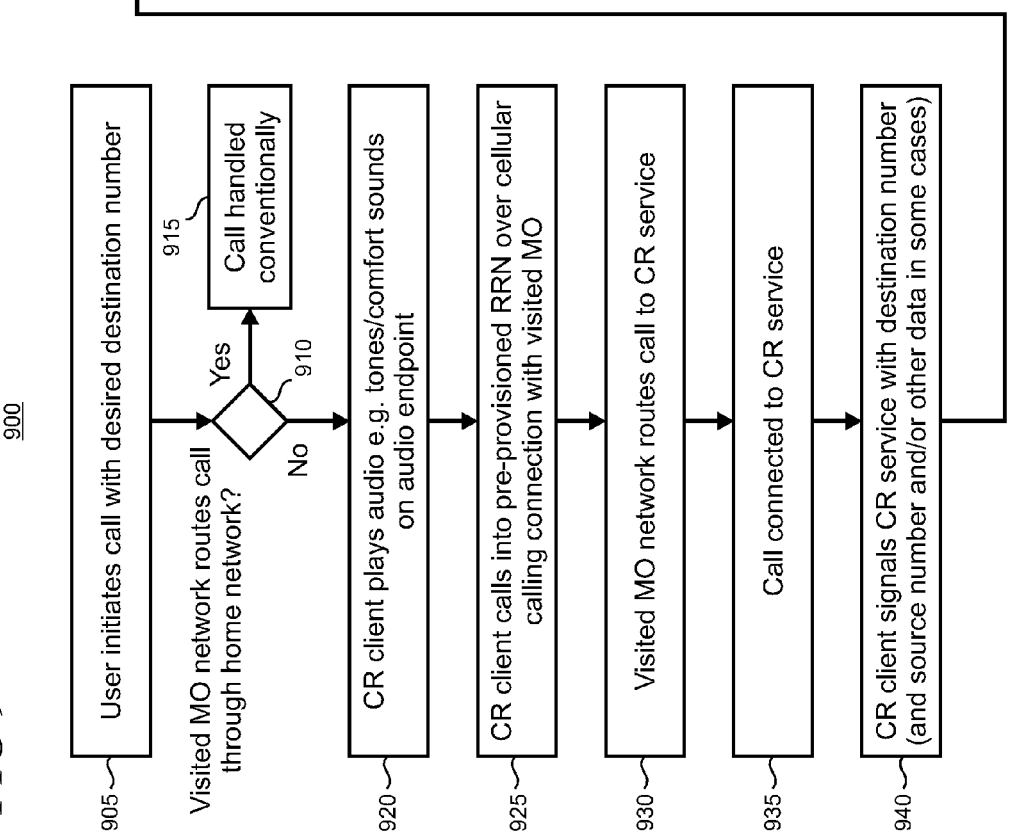
FIG 9

*FIG 11*
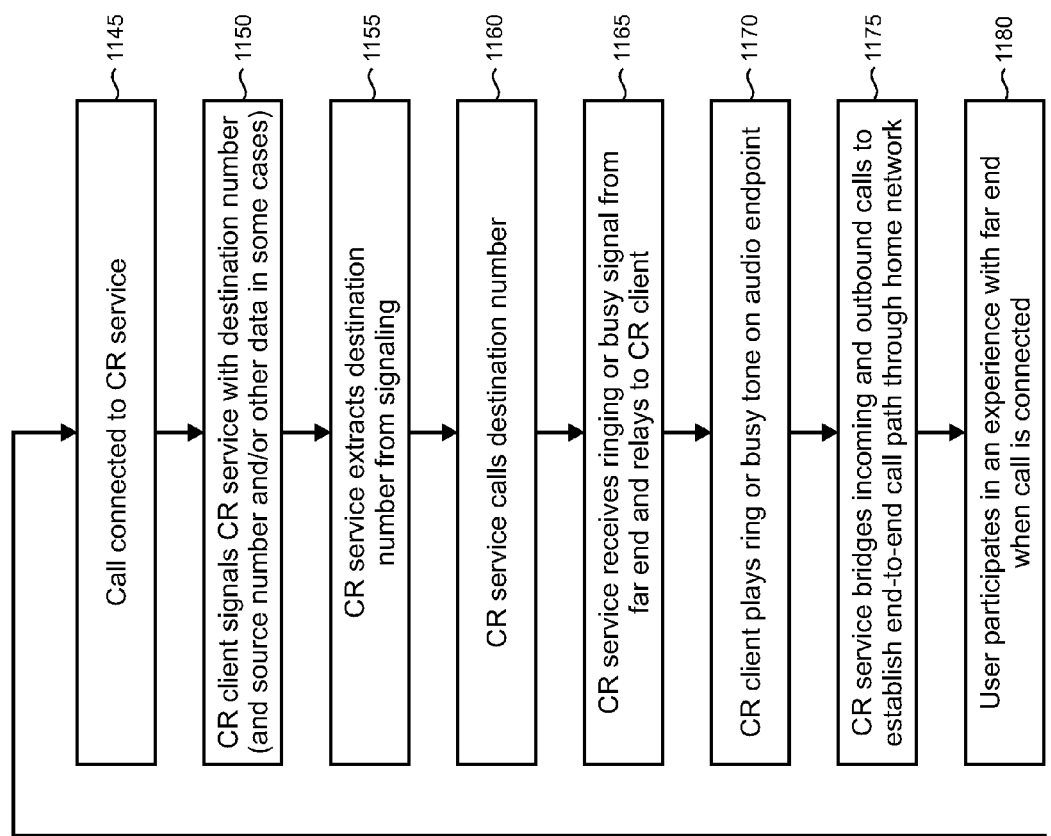
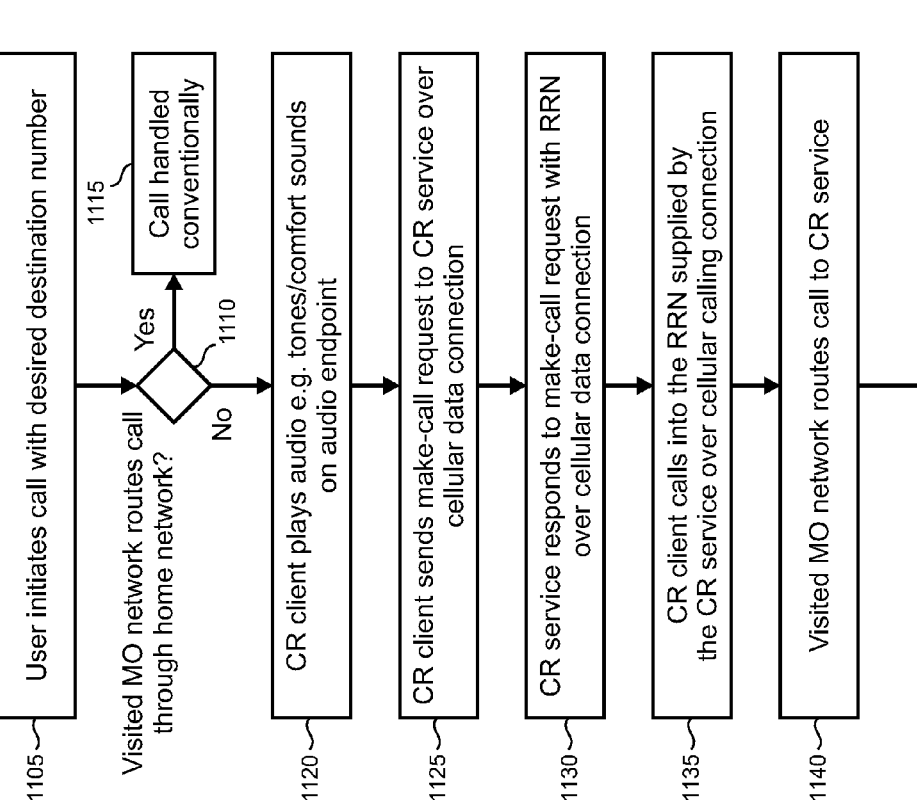

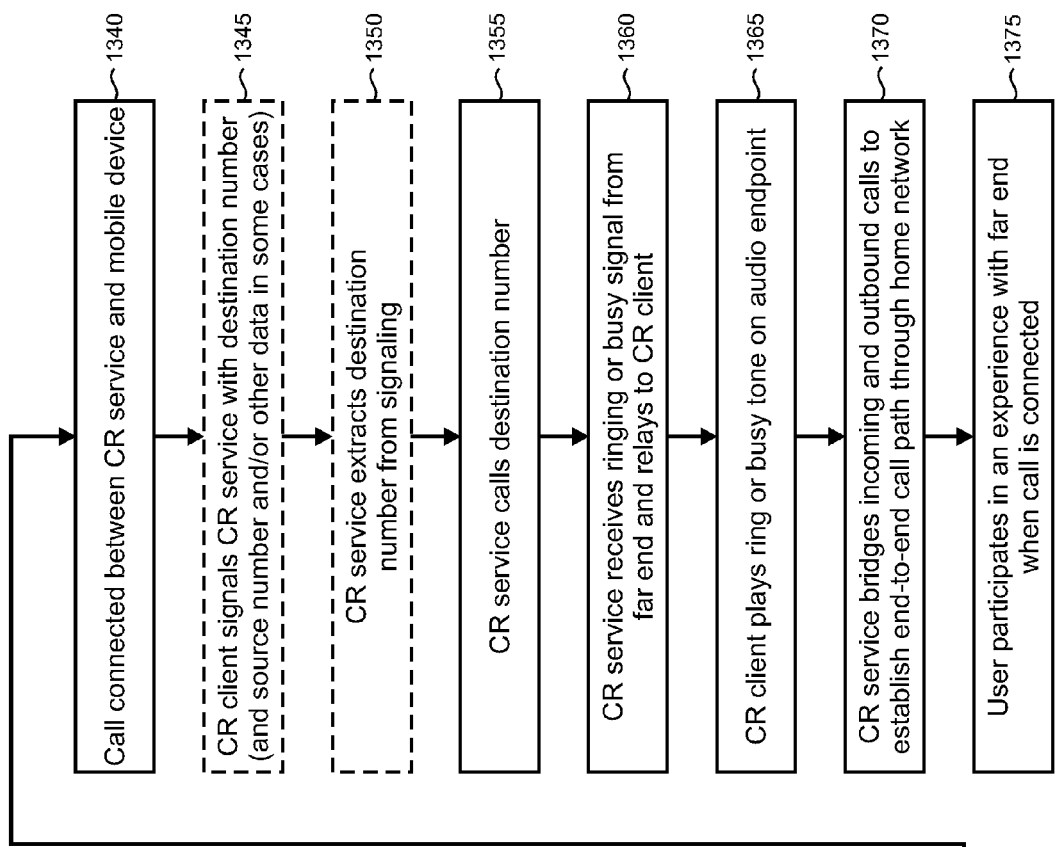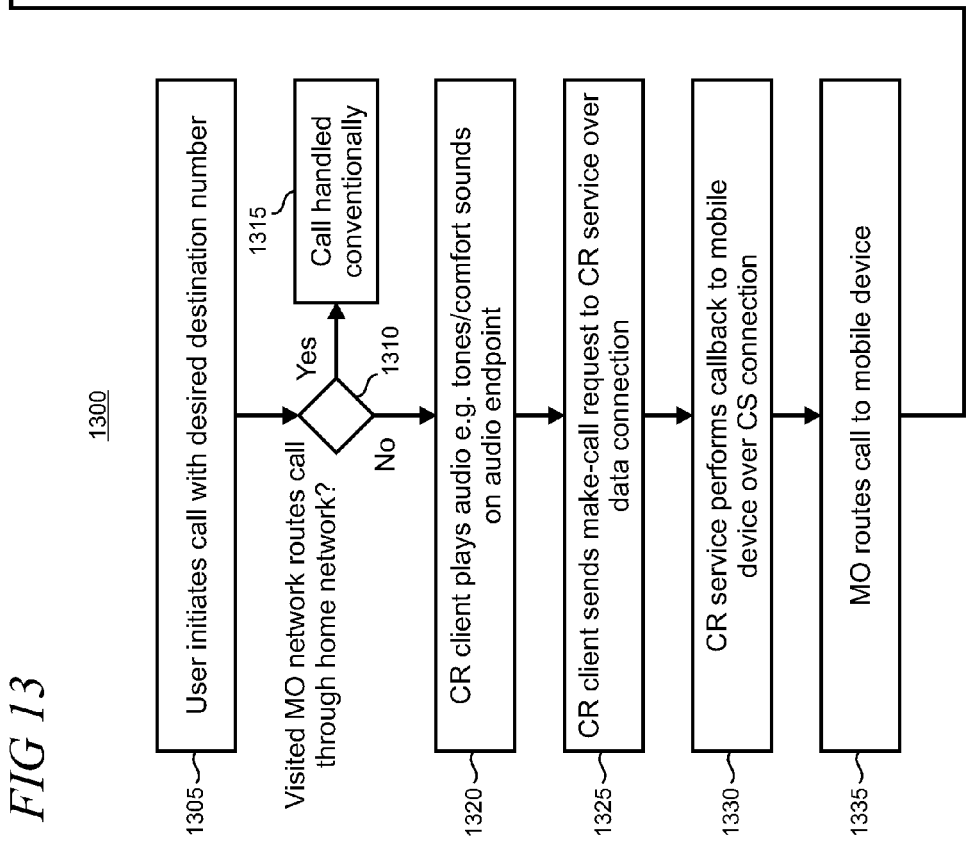
FIG 13

Dialing string, Example 1:
B + Destination Number + C + Hash + D
B, C, D = delimiters
FIG 14
Dialing string, Example 2:
A + Source number + B + Destination number + C + Hash + D
A, B, C, D = delimiters
FIG 15
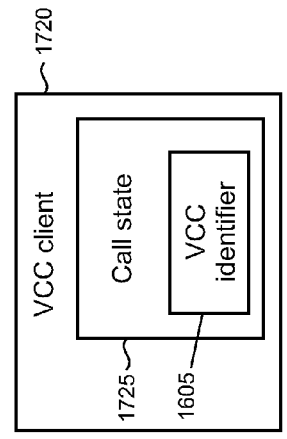
FIG 17
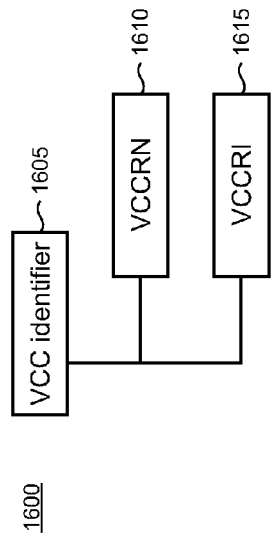
FIG 16

CENTRALIZED ROUTING IN HYBRID NETWORKS

BACKGROUND

Mobile device users have come to expect a consistency of experience, irrespective of the network to which they are connected. For hybrid networks that employ a combination of access network technologies—such as IP (Internet Protocol), cellular including CDMA (Code Division Multiple Access), GSM (Global System for Mobile communications), etc.—there are additional challenges that get in the way of providing a consistent user experience due to factors like access network type, roaming, and the like.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A mobile device utilizes a two-stage dialing solution when roaming on a visited mobile operator (MO) network to implement centralized routing so that a home network portion of a hybrid network is inserted into the path of outbound calls to support consistent user experiences across both local and visited networks as well as enhanced calling features such as voice call continuity (VCC). A centralized routing (CR) service exposed by the home network or a VoIP (Voice over Internet Protocol) core network interoperates with a CR client on the mobile device. When a call is initiated to a remote party, the CR client calls into an arbitrary roaming routing number (RRN) that is terminated in the home network. The RRN is either pre-provisioned on the mobile device or obtained from the CR service over a cellular data channel when available. Once the call is connected between the mobile device and home network, the CR client sends a dialing string that includes a destination number of the remote party. The CR service calls the destination number and then bridges the calls to the mobile device and remote party to establish an end-to-end call path between the local and far ends of the call that traverses the home network.

In various illustrative examples, the home network may be configured to forward the centrally routed calls to the VoIP core network so that media, signaling, and call context are anchored in the VoIP core network regardless of the call's point of origin or termination. Authorization, fraud management, and call control are streamlined by anchoring the call in the VoIP core network (using, for example, media relays or conference bridges) and such anchoring enables enhanced feature support such as call treatments (e.g., playing of audible indicators and/or recording and playback services) and VCC to be implemented. For VCC, the conditions under which devices operate on the hybrid network can be continuously monitored so that when a given connection (e.g., Wi-Fi, circuit-switched voice, and packet-switched data connections) in the hybrid network is determined to have been unacceptably degraded, is likely to be interrupted, and/or a more optimal connection is available (e.g., one that is less expensive, more reliable, higher quality, provides additional features such as high-definition ("HD") audio, etc.), a handoff of the call to another connection can be initiated so that call continuity is maintained using the lowest cost connection that provides acceptable call quality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 9 is a flowchart of an illustrative method 900 describing actions performed and associated call flows for the first illustrative implementation of centralized routing in hybrid networks;

FIG. 11 is a flowchart of an illustrative method describing actions performed and associated call flows for the second illustrative implementation of centralized routing in hybrid networks;

FIG. 13 is a flowchart of an illustrative method describing actions performed and associated call flows for the third illustrative implementation of centralized routing in hybrid networks;

FIGS. 14 and 15 show illustrative examples of dialing strings;

FIG. 16 shows an illustrative taxonomy for a voice call continuity (VCC) identifier;

FIG. 17 shows an illustrative VCC client;

Like reference numerals indicate like elements in the drawings. Elements are not drawn to scale unless otherwise indicated.

DETAILED DESCRIPTION

Mobile telecommunications networks are quickly evolving to include combinations of network types and access technologies that are configured in what are termed here as "hybrid networks." As described below in more detail, hybrid networks typically employ network portions that are controlled and managed by different entities and/or service providers. Hybrid networks can generally provide feature-rich and robust services to users of mobile equipment and devices across a wide variety of usage environments and scenarios and often at price points that are very attractive to both consumers and enterprises. However, providing consistent user experiences across the spectrum of interactions over hybrid networks is a design goal that is often difficult to achieve because of an inability in getting a core portion of the hybrid network (referred to as a "home" network) inserted in the call path of the calls traversing the network. That is, when a mobile device is roaming, the visited mobile operator (MO) implements what is called a local breakout (LBO) in which calls originated on the device are handled by the MO network directly without routing the call through the home network. Such lack of centralized call routing can make it more difficult, in some cases, to effectively deal with authorization, fraud management, and call control, and provide full feature support with a consistent user experience.

Figure 1:
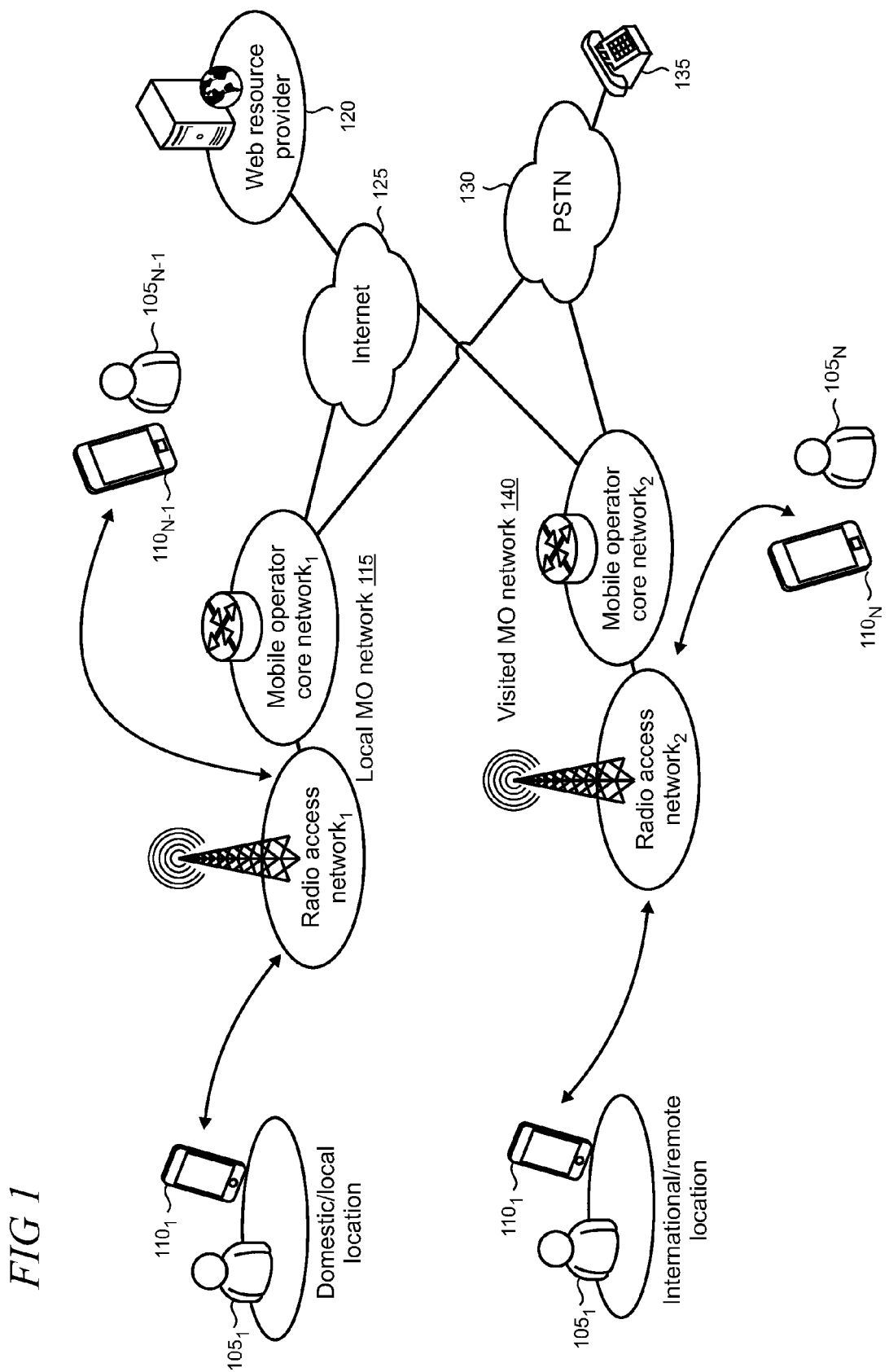
FIG. 1 shows an illustrative scenario in which a mobile device can connect to local and roaming mobile operator (MO) networks.

Turning now to the drawings, FIG. 1 shows an illustrative scenario in which a mobile device can connect to local and roaming MO networks. Here, a user 105₁ has a mobile device 110₁ that employs a local MO network 115 that comprises a radio access network and a core network to make voice calls and send texts to other devices 110, and access data and other resources on the web, as representatively supplied by web resource provider 120. The user 105 generally has a service agreement with the local MO 115 that covers mobile network usage when the mobile device 110 is within the MO's service area such as a domestic location and/or a location that is relatively local. Thus, for example, the user may have a subscription that provides a certain number of call minutes and a certain amount of data access per month with the local MO network 115.

When a user 105 and mobile device 110 move outside the local service area of the local MO network, the device can roam on a visited MO network 140 that provides service when the mobile device is in its coverage area, for example, such as an international location and/or a location that is relatively remote from the user's local area of coverage. Typically, the local and visited MOs have service agreements in place so that the user's roaming usage can be tracked and billed as appropriate. Both the local MO network 115 and visited MO network 140 can include various backend connections to other networks of different types including the Internet 125 and a public switched telephone network (PSTN) 130 that is operatively coupled to conventional telephony equipment 135 or to other equipment that uses a landline (not shown). Other backend networks (not shown in FIG. 1) could include VPN (virtual private networks), enterprise networks, PBX (private branch exchange) networks, and the like.

In this particular example, both the local and visited MO networks use CDMA (Code Division Multiple Access) radio technology. However, it is emphasized that CDMA network types are intended to be illustrative and that the present centralized routing in hybrid networks is not limited to use with any specific network type. Conventional GSM/UMTS (Global System for Mobile communications/Universal Mobile Telecommunications System) networks can address issues with centralized routing using intelligent network (IN) protocols and similar methodologies to allow a home network to influence the signaling path of a given call when the visited network supports the same protocols. By comparison, CDMA networks typically do not enable IN services to be invoked and do not have any mechanisms for the home network to be inserted into either the signal or audio call path for roaming subscribers.

The present centralized routing methodologies address issues associated with the lack of home network influence on calls in the context of hybrid networks. The home portion of a hybrid network is inserted into the call path of all outgoing calls without needing the visited MO network to support any IN protocols or be modified in any way. By routing calls through the home network, device authorization and fraud detection are enhanced and a full set of features such as voice call continuity (described below) are supported while providing a consistent user experience in which the user can utilize the same rich feature set in the same manner when accessing the user's home/local network or when roaming. A discussion of hybrid networks is now presented.

Figure 2:
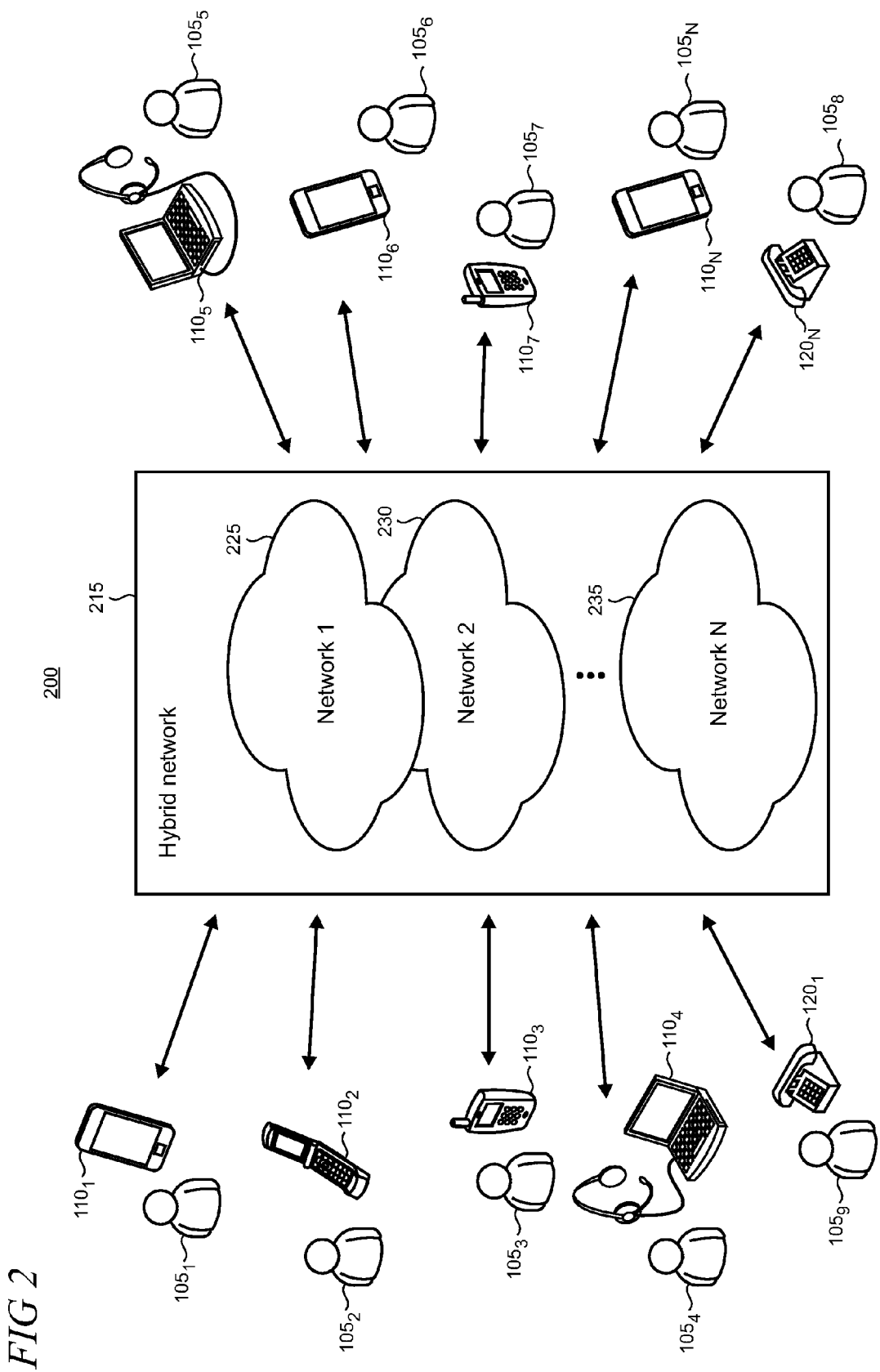
FIG. 2 shows an illustrative telecommunications environment in which mobile devices having telephony capabilities communicate over a hybrid network.

FIG. 2 shows an illustrative telecommunications environment 200 in which various users 105 employ respective devices 110 that communicate over a hybrid network 215. The devices 110 provide voice telephony capabilities and typically support data-consuming applications such as Internet browsing and multimedia (e.g., music, video, etc.) consumption in addition to various other features. The devices 110 may include, for example, user equipment, mobile phones, cell phones, and smartphones which users often employ to make and receive voice and/or multimedia calls, use applications and access services that employ data, browse the World Wide Web, and the like. However, alternative types of electronic devices are also envisioned to be usable within the telecommunications environment 200 so long as they are configured with telephony capabilities and can connect to the hybrid network 215, as described in more detail below. Such alternative devices variously include handheld computing devices, PDAs (personal digital assistants), portable media players, tablet devices, phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "mobile device" is intended to cover all devices that are configured with telephony capabilities and are capable of wirelessly connecting to the hybrid network 215.

Other types of telephony equipment may also be present in the telecommunications environment 200 such as conventional desktop phones 120 which are operatively coupled to a PSTN. Other examples may include equipment that connects to the PSTN using PBXs and equipment coupled to call services that are accessed using telephone numbers. This other telephony equipment may still be utilized in various scenarios involving call handoff and/or centralized routing. For example, a mobile phone 110 may make or receive a call to a desktop phone 120 and employ voice call continuity (as described in more detail below) as the prevailing connection conditions change such as when the mobile device user moves from a car to home during a call. The desktop phone 120 could also be used to place a call to a mobile device and leave a voicemail message if the mobile device user does not answer.

Figure 3:
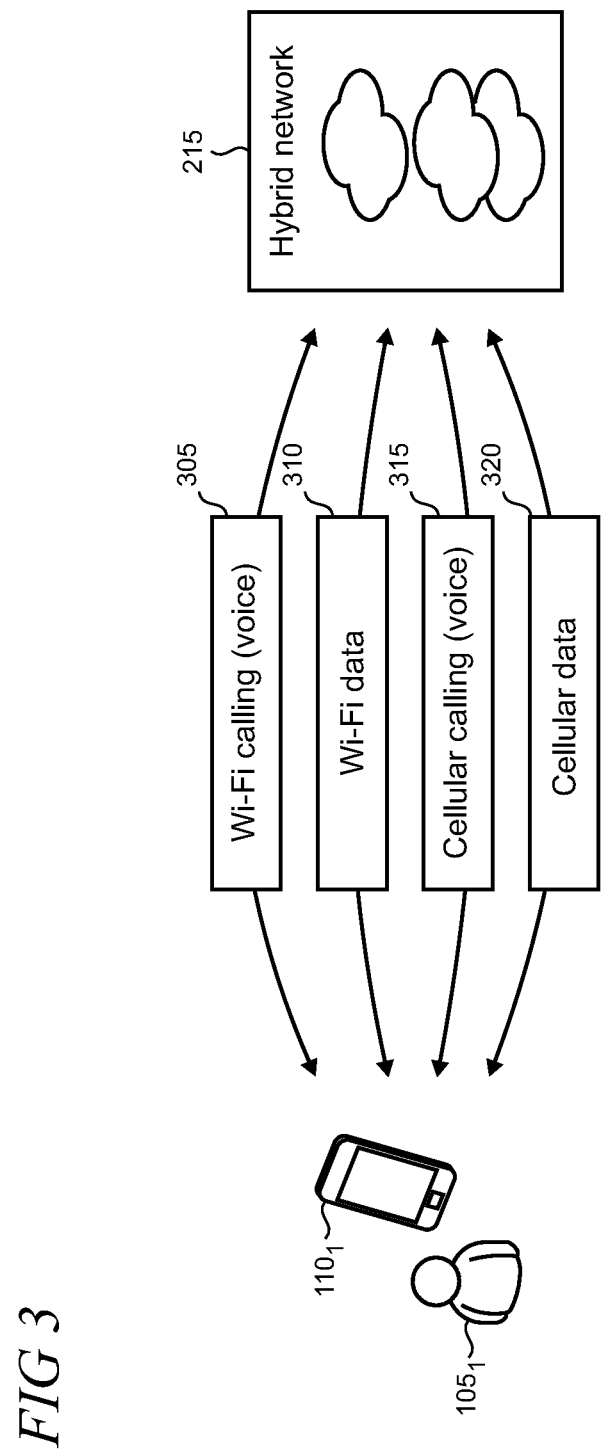
FIG. 3 shows an illustrative example of connection types over which a particular mobile device may access a hybrid network.

The hybrid network 215 comprises several networks 1, 2 . . . N, identified in FIG. 2 by reference numerals 225, 230, and 235, respectively. Typically, the various networks will be accessed using different types of wireless connections. For example, as shown in FIG. 3, the connection types may illustratively include Wi-Fi calling 305 (i.e., Wi-Fi voice), Wi-Fi data 310, cellular calling 315 (i.e., circuit-switched voice), and cellular data 320 (i.e., packet-switched data). Thus, the networks in the hybrid network 215 may include a VoIP network and a mobile operator (MO) network which typically includes an access network portion and a core network portion that provides for switching, routing, transport, and other functionalities. A PSTN wireline network may also be included as part of the hybrid network in some cases, as discussed in more detail below.

Each mobile device 110 will typically have a prearranged association with one or more of the networks underlying the hybrid network 215. For example as discussed above, a user 105 will typically be a subscriber to a cellular service provided by an MO so that the user's mobile device 110 can access a given cellular network as valid and authenticated user equipment. Similarly, the mobile device 110 may include functionality and credentials to access a Wi-Fi network. The mobile devices 110 may also interoperate with a VoIP network and be capable of providing voice call continuity (VCC) across different connection types according to a prearranged association. Such mobile devices are considered "VCC-equipped" and can access the hybrid network 215 over the different types of connections.

In some situations, a mobile device may be placed in a dock or cradle that is coupled to the PSTN and thus could employ a wireline connection for a call which is often the least expensive network connection. Typically, the mobile devices 110 use the less expensive Wi-Fi connection whenever it is available and capable of providing a reasonable level of call quality. When Wi-Fi is not available or is inadequate for the voice call, the call may be made over one of the other available network connection options after determining that the selected connection will result in acceptable call quality. Cellular voice is typically the costliest connection alternative but also the most ubiquitous and so it is used to ensure that the user has access to calling services from as wide an area as possible. In the description that follows, the mobile devices 110 are considered to be VCC equipped unless otherwise indicated.

Figure 4:
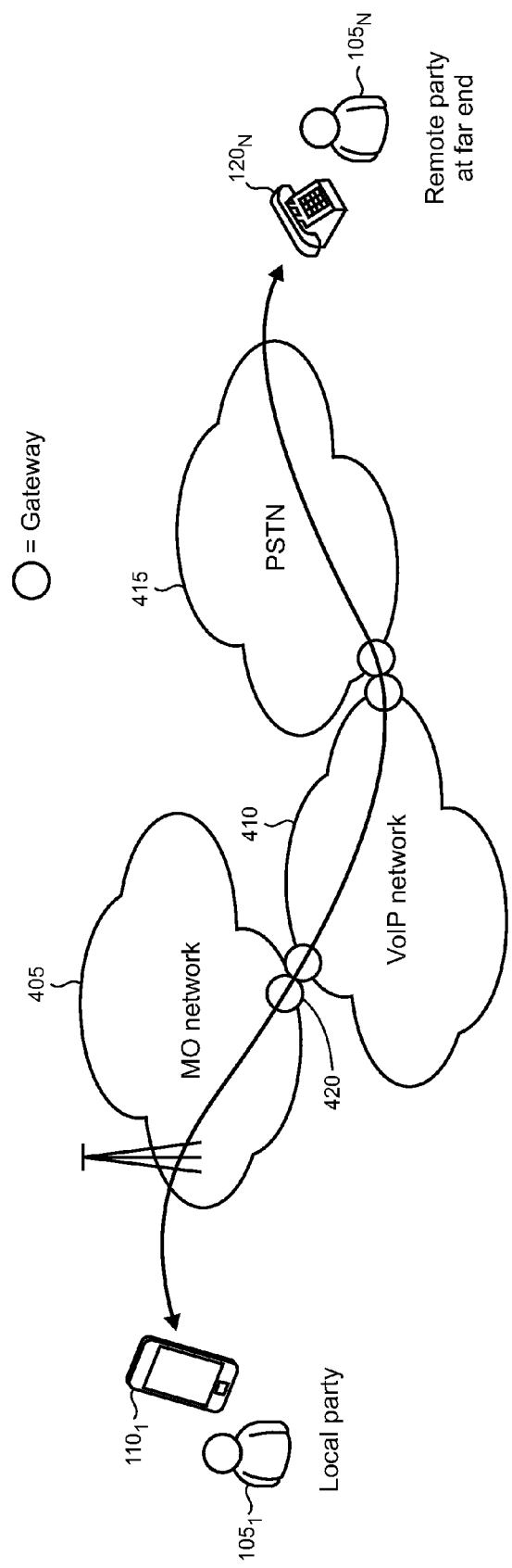
FIG. 4 shows an illustrative example in which a call is carried over multiple types of networks.

A characteristic of the hybrid network 215 is that two or more of the underlying networks (e.g., networks 225, 230, 235) are considered loosely coupled. That is, in one illustrative example, the VoIP network and the MO network are typically operated independently so that one network cannot exercise significant or substantial control over the operation of the other. However, as shown in FIG. 4, the underlying networks, while loosely coupled, are still interoperable so that calls can traverse an MO network 405, VoIP network 410, and PSTN 415. Such interoperability is commonly facilitated using gateways, as representatively indicated by reference numeral 420. It is becoming increasingly common for significant portions of a given call to be transported over the VoIP network 410 because such networks can often provide very high quality transportation at the lowest cost to the network operators. In such cases, the MO network 405 and the PSTN network 415 essentially function as access networks to the mobile device at each end of the call while the VoIP network 410 performs the bulk of the routing and transport for the call. Other access networks may also be utilized in order for a call to reach the VoIP network 410 including both cellular circuit-switched and packet-switched networks, and Wi-Fi access points (APs) such as public Wi-Fi "hotspots" and those provided by home and office Internet Service Providers (ISPs).

While such hybridization can provide cost-effective and high quality transport, the loose coupling has traditionally presented difficulties for VCC. VCC functionality is defined here as the maintenance of ongoing voice calls for a device that is capable of placing and receiving voice calls in the face of changes in prevailing connection conditions perhaps due to user mobility or other environmental factors. For example, the connection currently being used, such as Wi-Fi under IEEE (Institute of Electrical and Electronic Engineers) 802.11 could start demonstrating worsening radio signal and/or network congestion conditions, or the user could move to a location where the Wi-Fi connection does not work at all. In addition, other connection options may become available that are lower cost, or provide a better user experience, and therefore either or both the user and network operator may wish to utilize such connection options.

Figure 5:
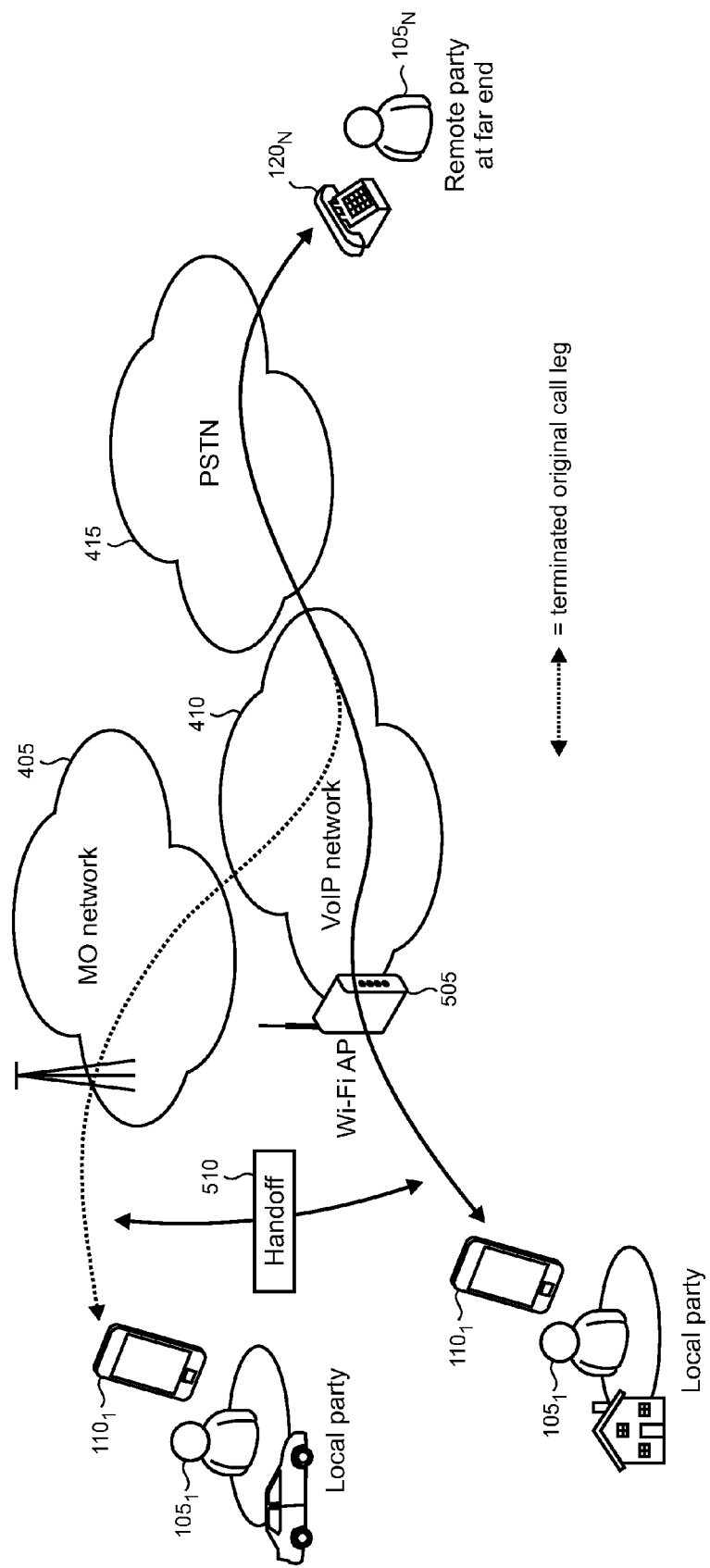
FIG. 5 shows an illustrative example in which a call is handed off between two different networks.

For example, as shown in FIG. 5, a user 105 may be in the car when initiating a call over the MO network 405. When the user 105 returns home, another call leg is then created over a selected connection which in this example is the home Wi-Fi connection via a Wi-Fi AP 505 to the VoIP network 410. The selected connection is associated with the call, preferably while the original call is still ongoing (in what is termed a "make-before-break" handoff). When the new call leg is stable, the original call leg is removed from the call and the handoff 510 to the new connection is complete.

If the handoff is initiated so that both the original and newly selected connections are operative simultaneously then there will be an intermediate state in which both call legs will be running in parallel. Media flows can be directed to and from the mobile device over these parallel connections, until one of the two flows is terminated. Such intermediate state enables the call to be maintained in an uninterrupted manner as perceived by the parties on both ends of the call. During the intermediate state, the mobile device can typically choose to connect to one of the two flows as it deems appropriate. An illustrative example of VCC is provided in more detail below in the text accompanying FIGS. 16-20.

Figure 6:
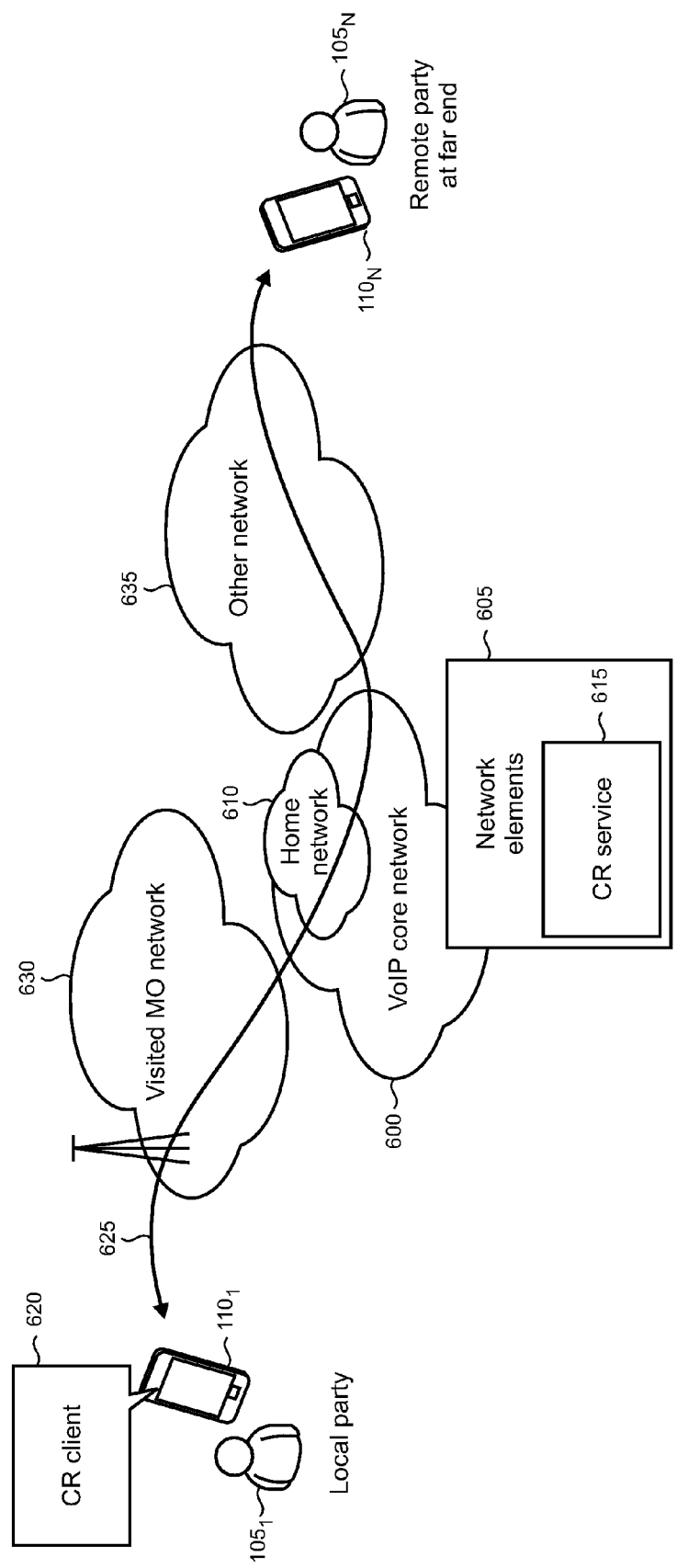
FIG. 6 shows network elements in a home network that can expose a centralized routing (CR) service that interoperates with a CR client on a mobile device.

The hybrid network described above may be configured to support the present centralized routing. As shown in FIG. 6, network elements 605 are instantiated in a VoIP core network 600 that interoperates, in this example, with a home network 610. In alternative implementations, the functionalities provided by each of the home and VoIP core networks can be combined in a single network or allocated differently between the home and VoIP core network from what is shown and described herein. In this illustrative example, as described below in more detail, using the two-stage dialing approach a CR client on a mobile device calls into the home network which can then function as an access network for the VoIP core network by forwarding the call from the client to the VoIP core network. In alternative implementations, the CR client may be configured to call directly into the VoIP core network.

The network elements 605 can be configured and utilized to support various features in the hybrid network including for example, exposing a centralized routing (CR) service 615 that interacts with a CR client 620 to implement insertion of the home network 610 in the call path 625 as the call traverses the hybrid network between the local and far ends. In this illustrative example, the hybrid network includes a visited MO network 630, the VoIP core network 600, the home network 610, and another network 635 that may be utilized to effectuate the connection to the far end such as a cellular network, other VoIP network, PSTN, etc. In some cases, the home network 610 and/or the VoIP core network 600 may directly interact with the remote party at the far end of the call without using the other network 635 as an intermediary (it is noted that the term "remote party" as used herein can refer to either a user or a telephony device depending on context).

Figure 7:
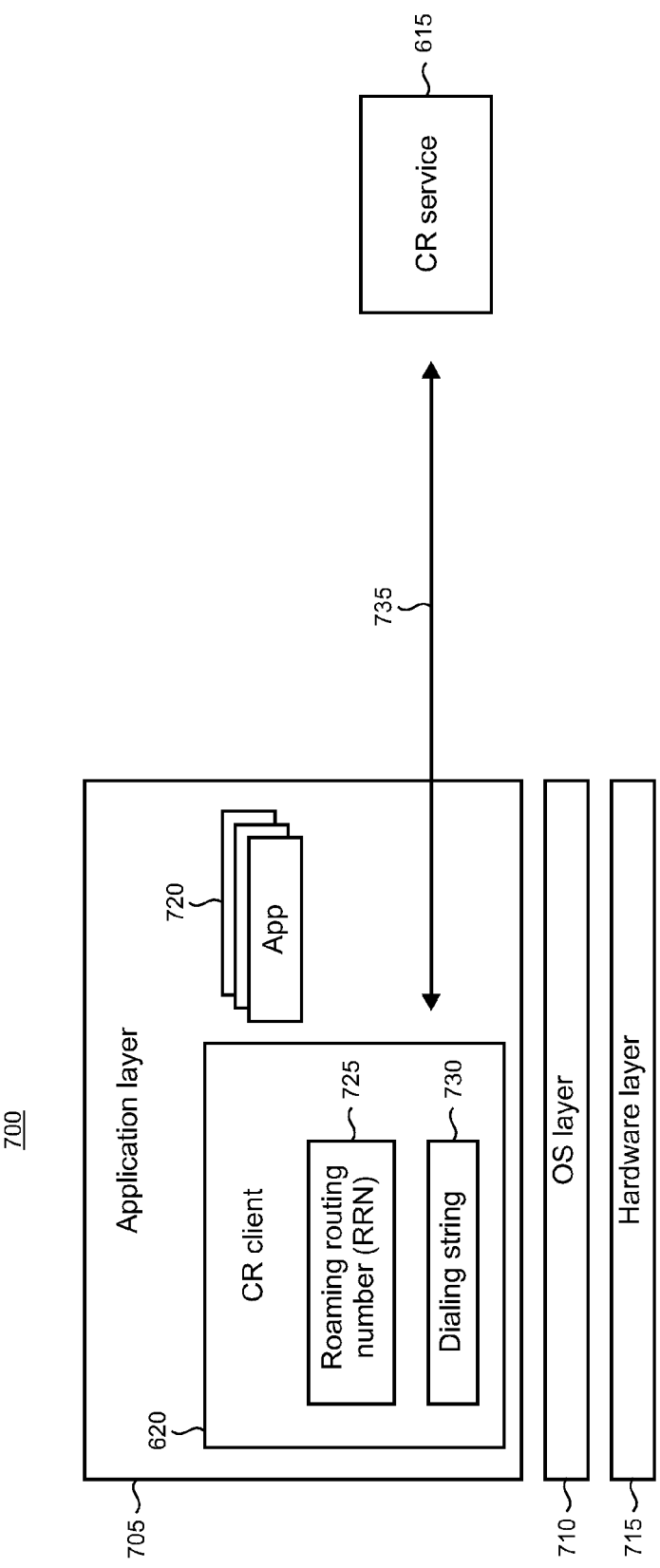
FIG. 7 shows an illustrative layered architecture used on a mobile device that may be used to implement various aspects of the present centralized routing in hybrid networks.

As shown in FIG. 7, a mobile device 110 can support a layered architecture 700 of functional components. The architecture 700 is typically implemented in software, although combinations of software, firmware, and/or hardware may also be utilized in some cases. The architecture 700 is arranged in layers and includes an application layer 705, an OS (operating system) layer 710, and a hardware layer 715. The hardware layer 715 provides an abstraction of the various hardware used by the mobile device 110 (e.g., input and output devices, networking and radio hardware, etc.) to the layers above it.

The application layer 505 in this illustrative example supports various applications 720 as well as the CR client 620. The applications 720 and CR client 620 are often implemented using locally executing code. However in some cases these applications may rely on services and/or remote code execution provided by remote servers or other computing platforms such as those supported by an external service provider or other cloud-based resources. While the CR client 620 is shown here as a component that is instantiated in the application layer 705, it will be appreciated that the functionality provided by the application may be implemented, in whole or part, using components that are supported in either the OS or hardware layers. As described in more detail below, the CR client 620 utilizes a roaming routing number (RRN) 725 and a dialing string 730 which may be locally stored on the mobile device 110 or stored in whole or part remotely, for example, using a cloud-based store or service.

The CR client 620 is configured to interact with the CR service 615 as indicated by arrow 735. In some cases, the CR client 620 will utilize other components (not shown) that are instantiated in the architecture 700 in order to implement such interactions and/or the other components may interact with the CR service directly as needed to implement the various features and functions described herein.

The present centralized routing is typically implemented so that outbound calls from a given mobile device will be routed through the CR service in the home network instead of allowing a roaming provider (e.g., the visited MO network) to locally break out the call and complete it directly. This may be accomplished by having the mobile device 110 call the RRN—a telephone number that terminates in the home network—to connect the caller to the destination number of the called party on the far end. Three alternative illustrative implementations are described next.

Figure 8:
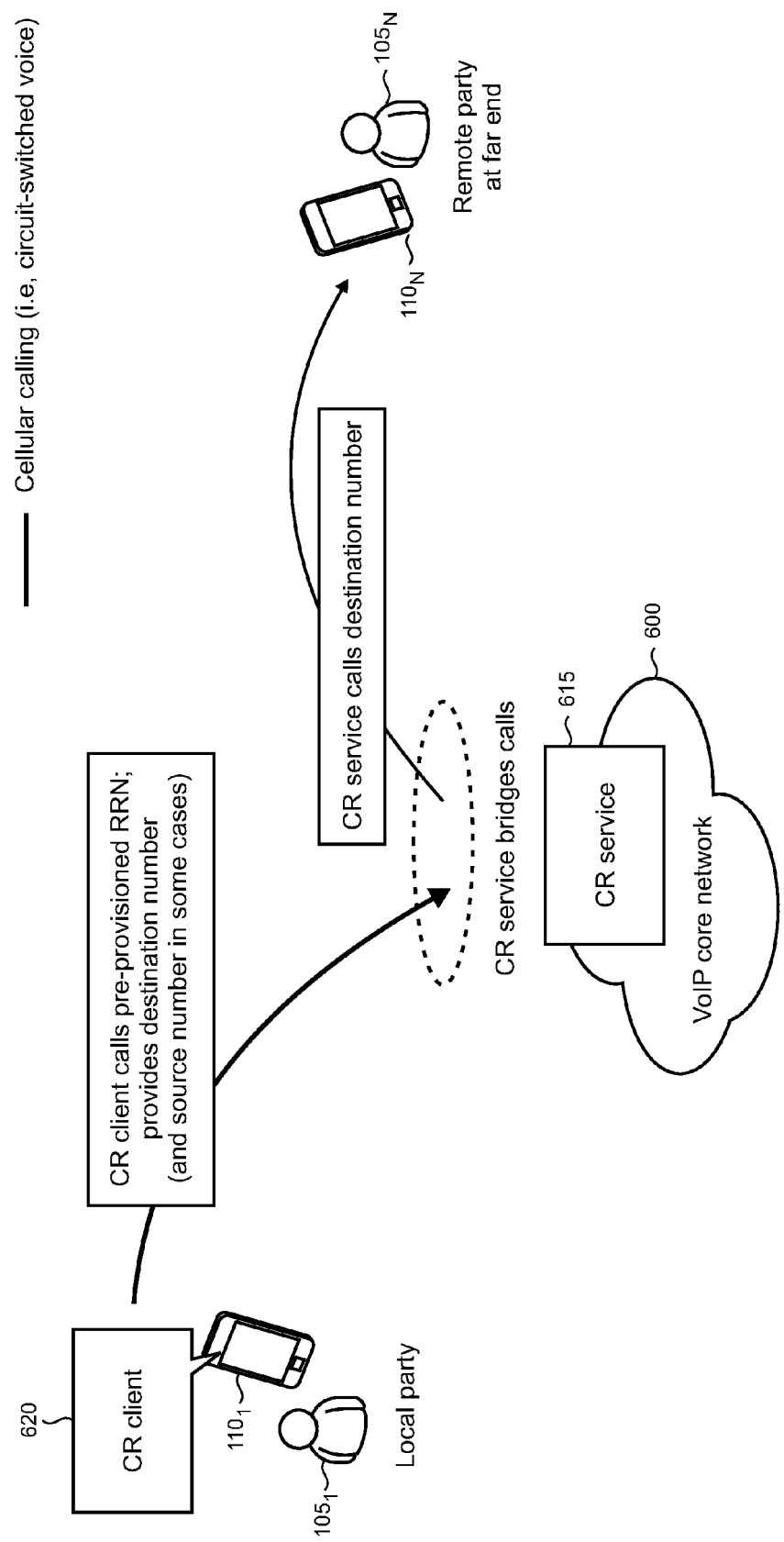
FIG. 8 shows an overview of a first illustrative implementation of centralized routing in hybrid networks.

In the first illustrative implementation of centralized call routing shown in an overview in FIG. 8, a two-stage approach is used in which the CR client 620 calls into the pre-provisioned RRN over a circuit switched cellular calling connection so that the MO (e.g., a visited MO network) routes the call into the home network 610 which forwards the call to the VoIP core network 600. Once the call is connected, the CR client 620 signals the CR service 615 using a dialing string in order to provide the desired destination number (i.e., the telephone number of the called party). The CR service calls the destination number and then bridges the inbound and outbound calls to create an end-to-end connection between the local and far ends.

FIG. 9 is a flowchart of an illustrative method 900 describing actions performed and associated call flows for the first illustrative implementation in more detail. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 905, the user 105 of the mobile device 110 initiates a call having a desired destination number over a visited MO network. Such call initiation may be performed in a conventional manner. For example, the user may use a keypad supported on the device to input the destination number, pick a number from a list of stored contacts, select a phone number included as a link in an email, text, or webpage use a voice command to input or select a number, etc. At decision block 910, if the visited MO network is configured so that it routes outgoing calls to the home network, then the call can be handled conventionally (that is, without utilizing any of the present centralized routing methodologies), in step 915. For example, the visited MO might route calls to the home network because of a prearranged agreement with the home network or other form of special connectivity.

If the visited MO network does not already route outgoing calls to the home network, then the method continues in step 920 where, in some cases, the CR client 620 can implement various call treatments such as recording and/or playing audio as the call is being set-up. For example, the CR client 620 can play audio including tones, white noise, voice, music, and/or "comfort sounds" on an audio endpoint on the mobile device 110 which may include the device's internal speaker, a wired or wireless headset/earpiece, external speaker/device, and the like. Playing audio on the device during the time it takes the call to being connected can be beneficial in some situations. For example, it may be expected that the two-stage approach can generally take more time to make a connection than the conventional LBO implemented by a visited MO. By providing audible feedback to the user that indicates that something is happening, the user knows not to hang up before the call is connected. The audio can include background white noise that is similar to what a user normally faintly hears in the background when the call is active but the other party is not speaking. Comfort sounds can have a similar effect as background white noise and may include sounds that are commonly soothing and relaxing to hear such as the sound of ocean waves, rainfall, and the like.

The CR client 620 can also be configured to play tones of various timbres, duration, volume, and pitch may also be played alone, together, and/or in sequences through the audio endpoint. The particular tones utilized can vary by implementation. Generally, the tones are designed to convey the impression to the user that call connection is in progress, something is going on, and the user should not hang up on the call. The meaning of the tones may be expected to become readily learned and appreciated as a desirable feature of the mobile device 110. For example, utilization of the tones helps to reinforce the user's appreciation that the user's familiar home network is in the call path so that calls are provided with a full feature set (such as VCC) and often at a lower cost than conventional roaming. Thus, hearing the tones becomes an accepted part of the user experience supported on the mobile device 110 and may also be used to support brand awareness and support of services provided by the home network 610.

Mid-call treatments such as audible indications and recording/playback services may also be performed when VCC is implemented during handoffs to notify either or both parties that a call transition is ongoing. These mid-call treatments serve to keep the users from terminating the call in case there is a short period of silence in the call or other perceived interruption during the handoff which might lead a user to believe that the call has been dropped or disconnected. The audible indications may comprise one or more tones, recorded or synthesized voice, comfort sounds, music, or other form of audible message that can be used to notify the user at the far end of the call (i.e., the end of the call that is not presently undergoing a handover) that a call transition is ongoing. In the case of a mid-call interruption, another treatment could insert an audible indicator requesting that the user at the far end stay on the call (e.g., "hold the line") while the call is being adjusted.

The recording and playback services of the mid-call treatments may include capturing portions of the conversations in a call, with the participant's permission, for later playback under certain conditions. In one illustrative example using a multi-party call scenario, parties to the call may be offered a replay of any conversation that may have been missed in the event of a call drop or other interruption that may occur during a handoff. The replay could occur at either normal speed or at a faster than normal speed so that a party could get caught up quickly and rejoin the conversation.

In step 925, the CR client 620 calls into the pre-provisioned RRN over the cellular calling connection (i.e., the circuit-switched voice connection). The pre-provisioning can be implemented in various ways including installation at the mobile device factory or retailer, downloaded as an update to the mobile device's CR client, operating system, applications, or the like. By pre-provisioning the RRN, the CR client 620 can reach the home network 610 without needing to obtain the RRN using an additional step, which can be beneficial in some applications. In step 930, the visited MO network routes the call using the RRN to the CR service 615 in the VoIP core network 600 over a circuit-switched cellular calling (i.e., voice) connection and the call is connected between the mobile device 110 and the CR service 615 in step 935.

Once the call is connected, in step 940, the CR client 620 signals the CR service 615 with the destination number. As described in more detail below in the text accompanying FIGS. 14 and 15, such signaling can be implemented, for example, by sending a dialing string over the cellular calling connection using audio-based DTMF (Dual-Tone Multi-Frequency) signaling. In addition to the destination number, the dialing string can include the source number (i.e., the number of the calling party) in some cases as well as other data that can enhance security and error detection and correction. In an alternative implementation, the destination number can be sent over a cellular data connection to the CR service when such connection is available.

In step 945, the CR service 615 extracts the destination number from the signaling sent by the CR client 620 and calls the destination number to reach the remote party in step 950. The outbound call can traverse various other networks and network types as needed to connect to the remote party.

In some cases, the CR service 615 will receive a signal from the far end that indicates ringing or busy status in step 955. For example, a PSTN can provide such signaling in the audio of the call while a VoIP network can provide such signaling using, for example, SIP (Session Initiation Protocol) messages. The CR service 615 can relay the status signaling from the far end to the CR client 620 on the mobile device using, for example, audio tones or other in-band signaling (in which such audio signaling implemented between the CR client and CR service may typically be kept muted from the device user). In response, the CR client 620 may be configured to play a ringing or busy signal on the device's audio endpoint in step 960 and discontinue playing other audio as described in step 920 in cases where such audio is utilized.

If the outbound call to the remote party does not get a busy signal, then in step 965 the CR service 615 can bridge the incoming call from the mobile device and the outbound call to the remote party to establish an end-to-end call path between the local and far ends (i.e., the calling and called parties) that traverses the home network 610. Once the call is connected, the user can participate in an experience with the far end, such as engaging in a conversation with the remote party, leaving a voicemail if the remote party is unavailable, etc., in step 970.

Figure 10:
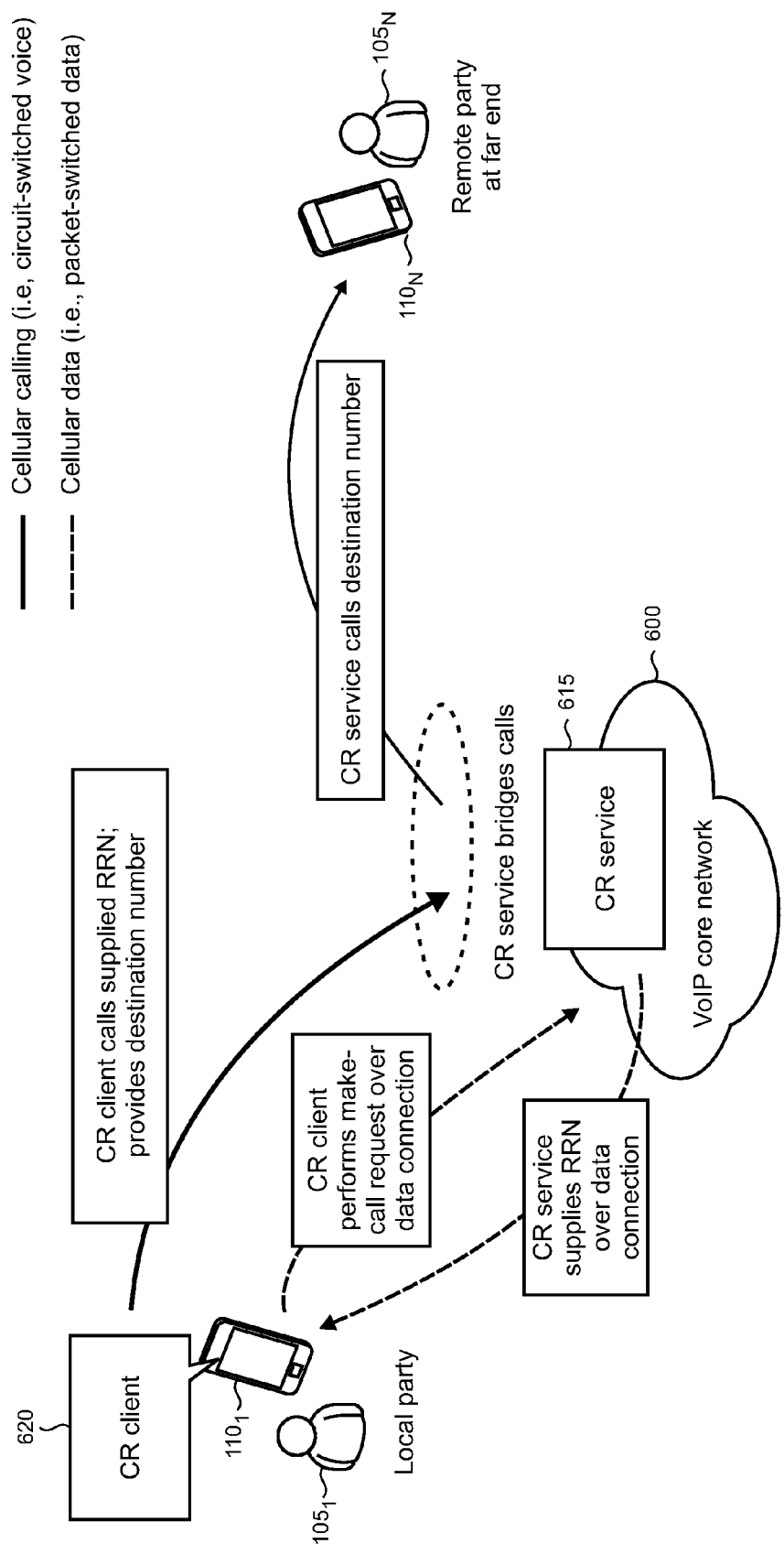
FIG. 10 shows an overview of a second illustrative implementation of centralized routing in hybrid networks.

FIG. 10 shows an overview of the second illustrative implementation of centralized call routing. This implementation is similar to the first shown in FIGS. 8 and 9, but instead of calling into a pre-provisioned RRN, the CR client 620 is configured to perform a make-call request to the CR service 615 over a cellular data connection when it is available. In response to the make-call request, the CR service 615 sends the RRN over the data connection to the CR client 620.

Once the CR client 620 receives the RRN from the CR service 615 over the cellular data connection, the rest of the call connection process is similar to that in the first implementation. That is, the CR client 620 calls into the RRN over a circuit switched cellular calling connection so that the MO (e.g., a visited MO network) routes the call into the home network 610. Once the call is connected, the CR client 620 signals the CR service 615 using a dialing string in order to provide the desired destination number. The CR service calls the destination number and then bridges the inbound and outbound calls to create an end-to-end connection between the local and far ends.

FIG. 11 is a flowchart of an illustrative method 1100 describing actions performed and associated call flows for the second illustrative implementation in more detail. In step 1105, the user 105 of the mobile device 110 initiates a call having a desired destination number. At decision block 1110, if the visited MO network is configured so that it routes outgoing calls to the home network, then the call can be handled conventionally (that is, without utilizing any of the present centralized routing methodologies), in step 1115.

If the visited MO network does not already route outgoing calls to the home network, then in some cases, in step 1120, the CR client 620 can play audio including tones, white noise, voice, and/or "comfort sounds" on an audio endpoint on the mobile device 110 during call set-up or mid-call.

In step 1125, the CR client 620 sends a make-call request to the CR service 615 over an available cellular data connection. "Available" as used in the present detailed description can mean either or both the presence of the cellular data connection from a technical perspective as well as being able to utilize the cellular data connection under policies and terms that are acceptable from a commercial or business perspective. For example, when the user and mobile device are roaming, a cellular data connection might be present and technically enabled for use, but the costs to communicate over the connection could be high enough to make the overall calling experience less than optimal. In such cases, the first implementation may be utilized more cost effectively.

In step 1130, the CR service 615 responds to the make-call request from the CR client 620 with the RRN over the cellular data connection. The CR client 620 calls into the RRN supplied from CR service 615 over the cellular calling connection in step 1135. The remaining steps in the method 1100, steps 1140 to 1180, are substantially the same as steps 930 to 970 in the flowchart 900 shown in FIG. 9.

Figure 12:
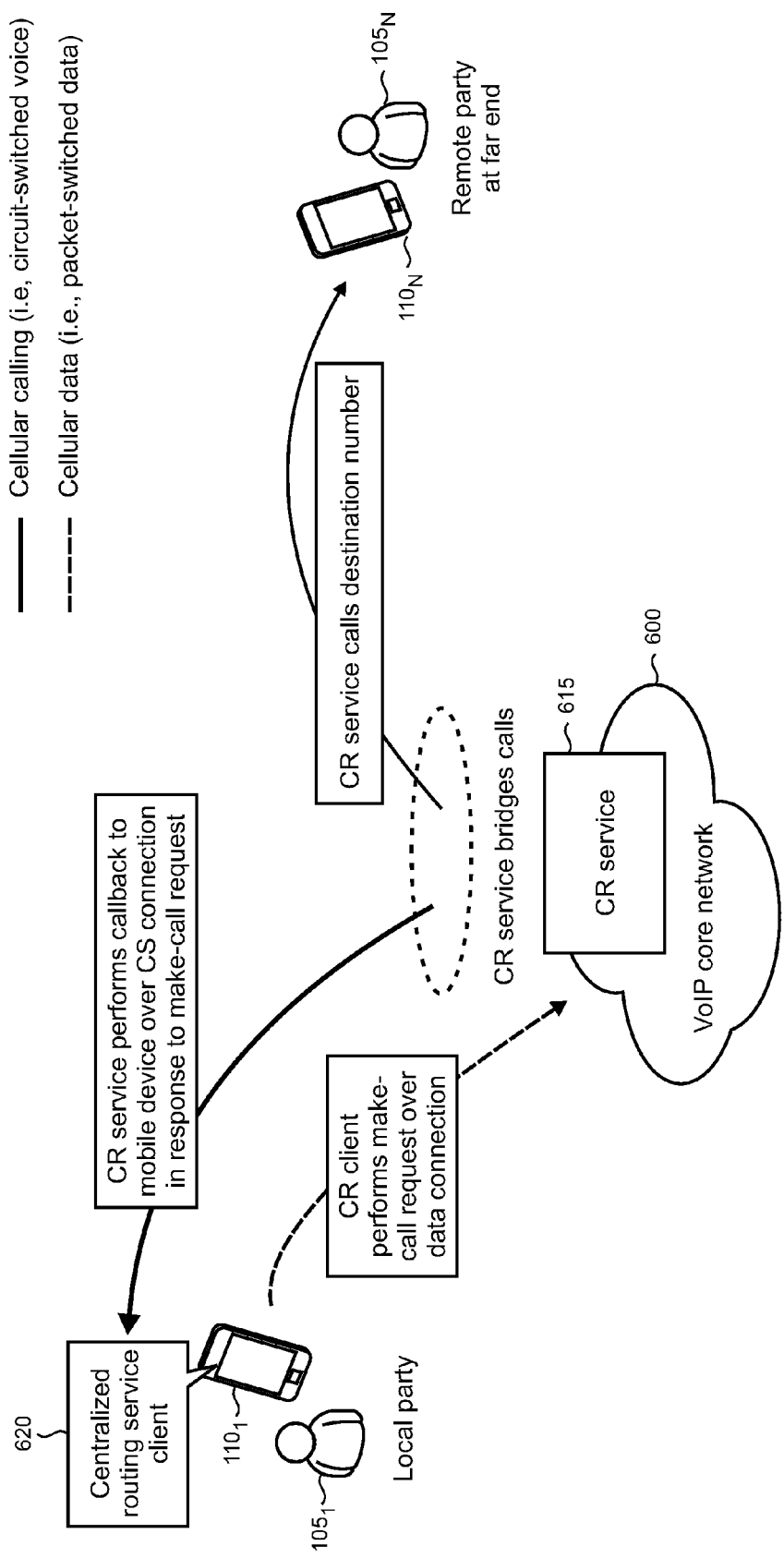
FIG. 12 shows an overview of a third illustrative implementation of centralized routing in hybrid networks.

FIG. 12 shows an overview of the third illustrative implementation of centralized call routing. This implementation is similar to the second implementation shown in FIGS. 10 and 11 in which the CR client 620 is configured to perform a make-call request to the CR service 615 over a cellular data connection when it is available. However, rather than send the RRN back to the CR client 620, in response to the make-call request, the CR service 615 places an outbound call to the mobile device 110 over a cellular calling connection. In this illustrative example, the make-call request over the cellular data connection can include the destination number so that the CR service 615 can place another outbound call to the remote party at the far end and then bridge both outbound calls to create an end-to-end connection between the local and far ends. Alternatively, instead of sending the destination number in the make-call request, the CR client 620 can send a dialing string to the CR service 615 that includes the destination number (among other information), as in the first and second implementations of centralized call routing.

FIG. 13 is a flowchart of an illustrative method 1300 describing actions performed and associated call flows for the third illustrative implementation in more detail. As in the other implementations, in step 1305, the user 105 of the mobile device 110 initiates a call having a desired destination number. At decision block 1310, if the visited MO network is configured so that it routes outgoing calls to the home network, then the call can be handled conventionally (that is, without utilizing any of the present centralized routing methodologies), in step 1315.

If the visited MO network does not already route outgoing calls to the home network, then in some cases, in step 1320, the CR client 620 can play audio including tones, white noise, voice, music, and/or "comfort sounds" on an audio endpoint on the mobile device 110 during call set-up or mid-call.

In step 1325, the CR client 620 sends a make-call request to the CR service 615 over an available cellular data connection. In this particular example, the make-call request can include the caller ID (i.e., source number), destination number (as well as other information such as security, error detection, and/or error correction data that would otherwise be included in the dialing string as discussed below). However, in alternative implementations, the CR client 620 can send the destination in a dialing string over a cellular calling connection in the same way as with the first and second implementations.

In step 1330, in response to the make-call request, the CR service 615 performs a callback to the mobile device 110 using the source number from the caller ID contained in the make-call request. The MO routes the outbound call to the mobile device in step 1335 and the call is connected between the CR service 615 and mobile device 110 in step 1340. As noted above, in some cases the CR client 620 will signal the CR service with the destination number and other data in a dialing string and the service will extract the destination number from the signaling as respectively shown in steps 1345 and 1350. As these steps are alternatively utilized they are shown with dashed borders. The remaining steps in the method 1300, steps 1355 to 1375, are substantially the same as steps 1160 to 1180 in the flowchart 1100 shown in FIG. 11.

The CR client 620 can be arranged to apply heuristics, rules, or policies to determine which of the alternative implementations for centralized routing are optimally utilized for a given usage scenario. In some cases the heuristics or rules can take into account connection statistics (e.g., success/failure of connection attempts with different MOs at different locations, time needed to complete a connection with different MOs at different locations, etc.) that are collected over time at the mobile device (typically with notice to the user and user consent). In addition, connection statistics can also be collected from a larger universe of users of the home network. The heuristics, rules, or policies can be periodically downloaded to the CR client 620 from the CR service, for example, to update the mobile device's CR client, operating system, applications, or the like.

FIG. 14 shows an illustrative example of a dialing string 1400 that may be utilized when dialing into an RRN over a cellular calling connection. Once connected, the CR client 620 (FIG. 6) signals the CR service using the dialing string which is typically transmitted using audible tones. The tones could be generated, for example, using DTMF or TDD/TTY (Telecommunications Device for the Deaf/Teletypewriter) encoding schemes. Other transmission schemes and protocols including, for example, USSD (Unstructured Supplementary Service Data) under GSM may be employed for dialing string transport in situations in which CDMA radio systems are not utilized.

As shown, the dialing string 1400 includes fields for the destination number 1405 and a hash 1410. The DTMF character set includes numeric digits 0 through 9, letters A, B, C, and D, and characters * (asterisk) and # (hash). In the dialing string 1400, the letters, B, C, and D are used as delimiters. The destination number 1405 will typically be a string of numeric digits that is routable through a network to the remote party at the far end.

The inclusion of the source number may be necessary if an MO network cannot be trusted to send the calling mobile device's caller ID. In this situation the dialing string 1500 shown in FIG. 15 may be utilized which includes a field for the source number 1515 along with fields for the destination number 1505 and hash 1510. In the dialing string 1500, the A, B, C, and D are used as delimiters. The CR service 615 may issue instructions in some cases to the mobile device 110 indicating how the dialing string is to be formed (i.e., whether or not it includes the source number) and how it is to be transmitted.

The hash (indicated by reference numerals 1410 and 1510 respectively in FIGS. 14 and 15) is a computed value from the source number (when included), destination number, and a shared PIN (personal identification number). The shared PIN is a value known to both the CR service 615 and the mobile device 110 and is used to authenticate the calling party (e.g., user 105). Although a hashing algorithm is used in the examples shown in FIGS. 14 and 15, other encoding functions may also be utilized in alternative implementations such as the Luhn checksum algorithm.

The hash typically performs two functions including enhancing security and enhancing signaling transmission reliability. In the case of security enhancement, as the hash is computed using the PIN, it enables the CR service 615 to positively identify the calling party should the caller ID get spoofed somehow. In the case of signaling transmission reliability, the PIN also helps ensure that the DTMF tones are reliably transmitted over the cellular calling connection. If a discrepancy exists in the calculated hash values, then the CR service 615 knows that an error exists and can request the CR client 620 to retransmit the dialing string to thereby correct the dialing string so that an incorrect number is not called.

When transmitting the dialing string the CR client 620 on the mobile device 110 may need to wait until the CR service 615 is ready to receive the dialing string. For example, the CDMA-based MO networks shown in this particular example do not signal the mobile device when a call is connected. Since it does not know when a call is connected, it is not possible for the mobile equipment to positively determine if the dialing string is to be sent and received by the CR service. This may be mitigated in some scenarios in various alternative ways including, for example, pausing for a pre-determined amount of time, retrying on failure, or by waiting for an audible signal, tone, or other audible indicator from the CR service to indicate that it is ready to receive the dialing string from the CR client.

In the case of pausing, the length of the pause can be variable and adaptively controlled according to heuristics, rules, or policies provided by the CR service 615 that can take into account the user's location and the MO network and network type, for example. Thus, the CR service 615 can provide values for pause length to the CR client 620 depending on the user's location, the particular MO network being utilized, network characteristics, error conditions that are experienced, and other context. The pause length values can be adjusted as connection statistics and other data is collected over time. In the case of the indicator, the mobile device listens for a pre-determined indicator and starts transmitting after it is detected. Other examples of adaptability may include adjusting the length of a given DTMF tone and/or the length of time between transmitted tones according to applicable context.

An illustrative VCC example is now presented in more detail in which a call is made between a mobile device on a Wi-Fi connection and a conventional phone on a PSTN. The VoIP core network is arranged to interoperate with special voice call continuity capabilities that are instantiated in VCC-equipped mobile devices 110. More specifically, each call for a particular mobile device is assigned a VCC identifier upon the call's creation by a call continuity service (CCS) that operates in the core VoIP network 600 (FIG. 6), as described in more detail below. As shown in the taxonomy 1600 in FIG. 16, the VCC identifier 1605 may take a variety of forms. For example, it may have the form of a VCC routing number (VCCRN), as indicated by reference numeral 1610 or a VCC resource identifier (VCCRI), as indicated by reference 1615. The VCCRN and VCCRI are functionally equivalent and differ only in form. The VCCRN may use the format of a telephone number such as an MSISDN (Mobile Station International Subscriber Directory Number) number, while the VCCRI may take the form of a URI (Uniform Resource Identifier), for example an E.164 number under the ITU-T (International Telecommunications Union Telecommunication Standardization Sector). In the discussion that follows the term VCCRN is consistently utilized when referring to the VCC identifier. However, which equivalent form of the identifier is applicable will be apparent from the context of the discussion.

The VCC identifier 1605 is used to associate all the various call legs pertaining to a given call which are created for that mobile phone during the call continuity and handoff procedures. For example, for the purpose of call handoff, when a new mobile phone call leg is generated, the new call leg is associated with the same value of the VCCRN as the original call leg for the mobile phone. The VCCRN is unique for each call to a given mobile phone, which may be simultaneously executing, and also over a guard time interval to ensure uniqueness among the mobile phone's calls. Although the VCCRN can take the form of an MSISDN telephone number, it typically does not need to be routable over the PSTN and thus is not included in the LERG (Local Exchange Routing Guide) or BIRRDS (Business Integrated Routing and Rating Database System) databases. However, in alternative implementations the VCCRN may be included in such databases in scenarios in which the VCCRN is a routable telephone number that is associated with the core VoIP network 600.

As shown in FIG. 17, a VCC client 1720 may be instantiated on a VCC-equipped mobile device and utilized to implement VCC functionality. In some cases, the VCC client can be implemented as an application, while in alternative arrangements the VCC client may be incorporated in the OS layer 710 (FIG. 7) or hardware layer 715, or its functionality distributed across layers. The VCC client 1720 exposes functionality including for example VCC identifier 1605 discovery during the mobile phone's interaction with the core VoIP network 600, for example during the call's signaling or upon request when the phone has IP connectivity. The VCC client 1720 may store the VCC identifier 1605 in order to maintain a local call state, as indicated by reference numeral 1725. The VCC client 1720 may also include functionality and logic to make device-initiated handoff decisions. Handoff decisions typically comprise evaluating a variety of parameters related to the expected call quality for each connection including radio/network and call quality characteristics at the present time and a prediction of the parameters' state in the near future. Traffic and loading conditions may also be evaluated. In addition, other environmental factors such as sensed user-activity state and ambient conditions can also be factored into the evaluation, as well as history of usage patterns for the mobile phone's user and the phone's location. When this evaluation indicates that a handoff should be performed, then the new connection is selected and the handoff process initiated.

Figure 18:
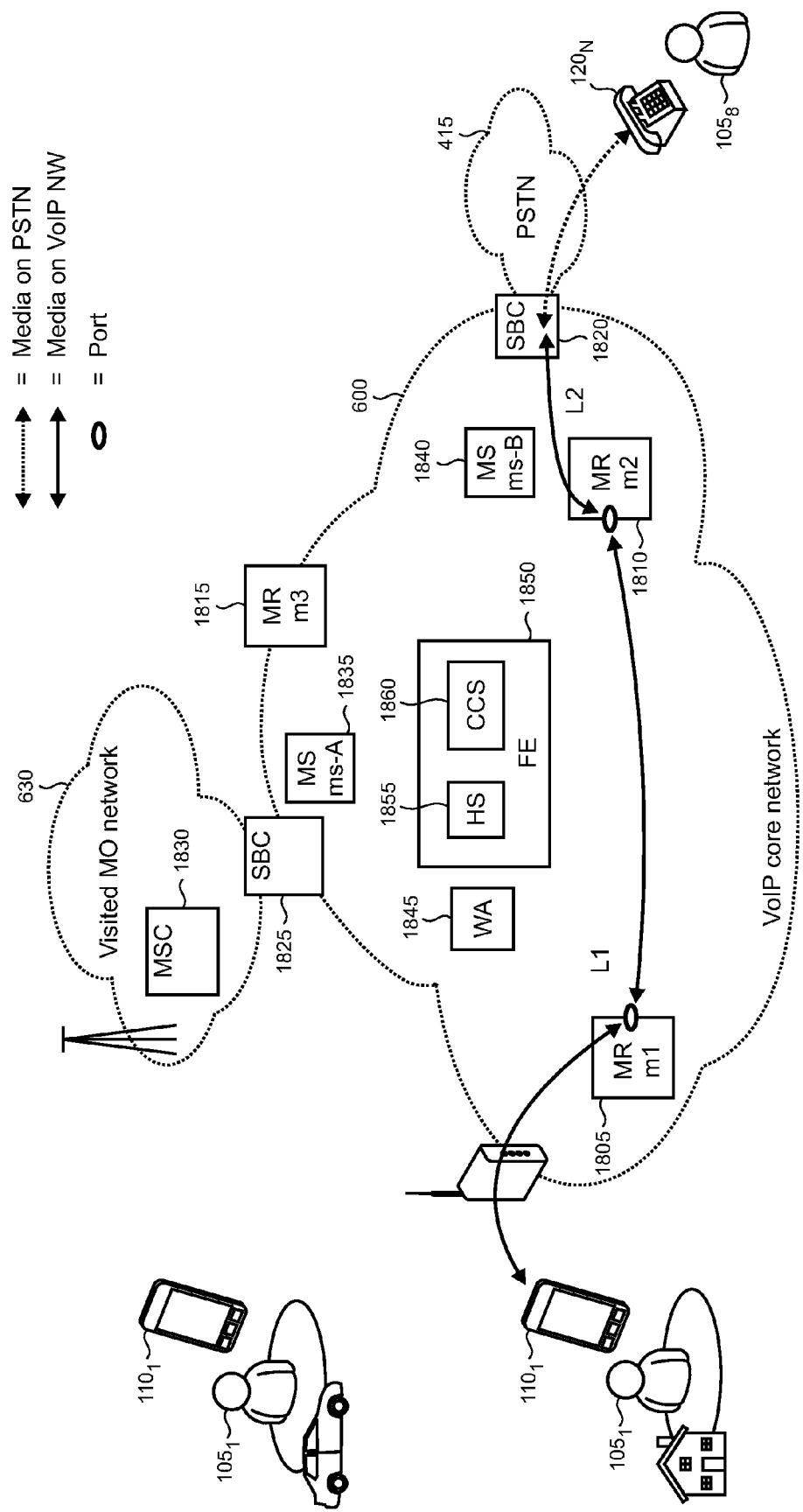
FIG. 18 shows an illustrative initial state of a hybrid network topology for a call between a mobile phone on a VoIP connection and a device on a public switched telephone network (PSTN)

The initial state for this illustrative VCC example is shown in the topology in FIG. 18. It may be assumed that the mobile device 110 has already discovered and stored in its local call state the VCCRN value for the call for which handoff is to be performed. As shown in FIG. 18, the VoIP core network 600 includes media relays m1, m2, and m3, as respectively indicated by reference numerals 1805, 1810, and 1815. An SBC server 1820 operates as the gateway to PSTN 415 and an SBC server 1825 operates as a gateway to the visited MO network 630 which includes a mobile switching center (MSC) 1830. Mediation servers ms-A and ms-B, respectively indicated by reference numerals 1835 and 1840, are also supported in the VoIP core network 600.

The VoIP core network 600 also supports a web access (WA) server 1845 and a front end (FE) 1850 that includes a home server (HS) 1855 and the CCS 1860. The WA 1845 functions as a signaling plane server with which the mobile device 110 carries out all signaling interaction with the VoIP core network 600. The WA 1845 also acts as an agent on behalf of the mobile device in interactions with the other signaling plane elements of the VoIP core network 600. The FE 1850 provides call handling in the signaling plane including various functions such as call routing. The HS 1855 provides signaling proxy in the VoIP core network 600. As noted above, the CCS 1860 is responsible for maintaining the call state in the VoIP core network 600 and generates the related parameters including the VCCRN.

At some point in time, the VCC client 1720 (FIG. 17) on the mobile device 110 determines that conditions are such that a handoff to the cellular CS connection is warranted. For example, the user 105 moves from home to a car. The handoff is performed in three stages (in which the hybrid network may be viewed as being in a particular state—i.e., initial state, intermediate state, and final state—in each corresponding stage). In particular, a new call leg is created in the initial stage, parallel media paths are created in an intermediate stage, and the handoff is completed in the final stage.

Figure 19:
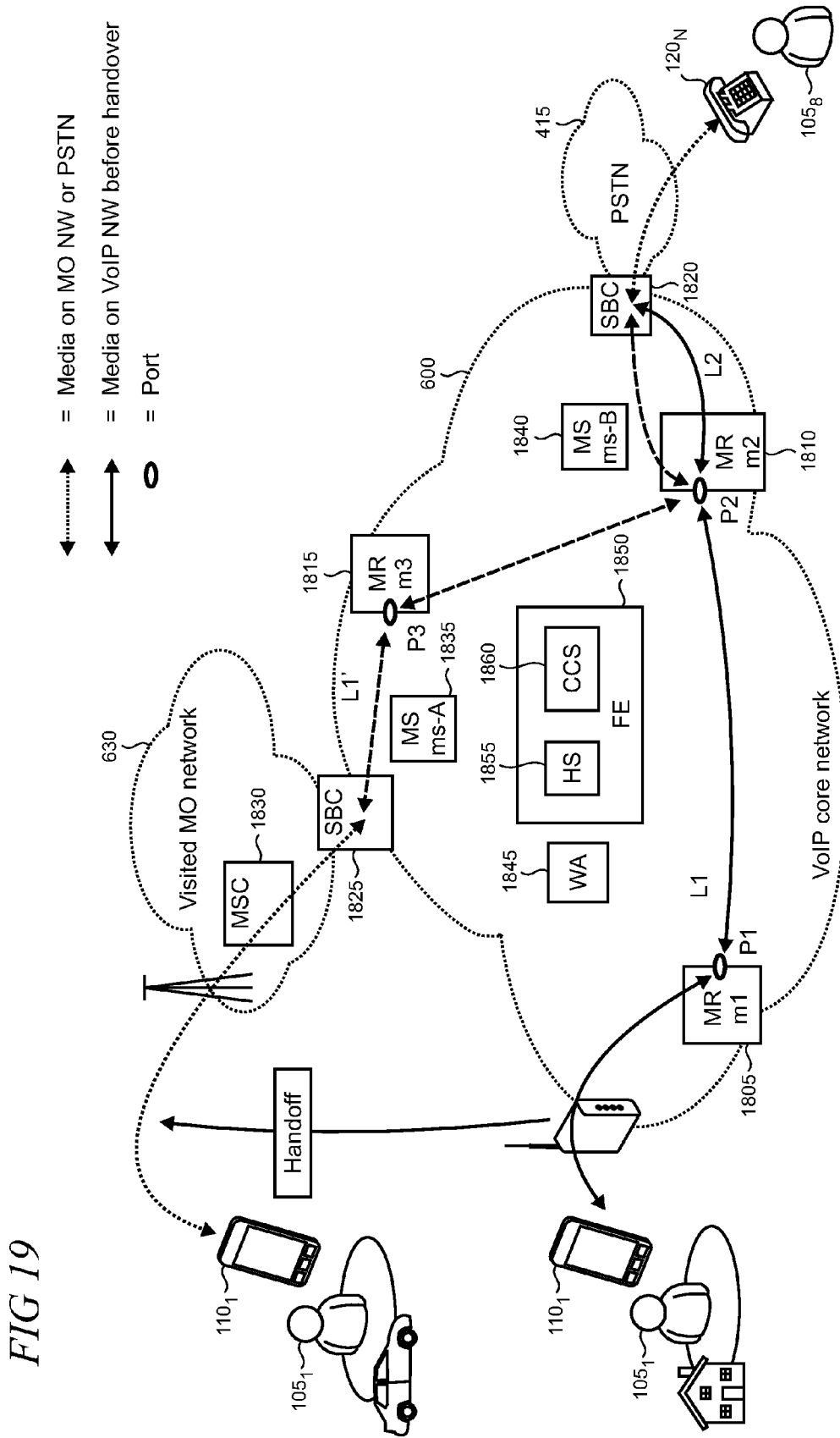
FIG. 19 shows an illustrative intermediate state of a hybrid network topology for a call in which a VCC handoff is underway.

As shown in FIG. 19, during the new call leg, the mobile device 110 places a call over its CS connection using the two-stage dialing solution described above in order to ensure that the call traversing the visited MO network over the CS connection is anchored in the VoIP core network 600. Once the call is anchored, the mobile device can provide signaling parameters including, for example, Caller ID and VCCRN. The MSC 1830 in the visited MO network 630 forwards the call signaling to the SBC 1825 which, in turn, sends the call signaling to the mediation server ms-A 1835. As noted above, calls to and from the VCC-equipped mobile devices that are associated with the VoIP core network 600 are routed to that network regardless of the point of origin or termination of the call. The mediation server ms-A 1835 allocates a port P3 on a nearby media relay m3 1815 and continues with the call signaling. The VoIP core network 600 then implements voice call continuity using a saved call state from the stored VCCRN to relate the new call leg to the original call. This enables the new call leg L1' to be incorporated into the original call via the media relay m3 1815 on port P3 to the port P2 on media relay m2 1810.

During the intermediate stage of call handoff, the additional parallel call leg L1' is created from the mobile device 110 to the media relay m3 1815 over the new connection. Accordingly, for some time interval, there will be two parallel call legs, L1 and L1' one on each of the CS and VoIP/Wi-Fi connections between the mobile phone 110 and the respective media relays m1 and m3. The media stream coming from the far end of the call on the PSTN 415 can be delivered over both of the L1 and L1' legs to the mobile device 110. The VCC client 1720 (FIG. 17) on the mobile device 110 may enable one of the two media streams to be connected to the mobile phone's audio capture-and-rendering hardware, which may include for example, a microphone and speaker output.

Figure 20:
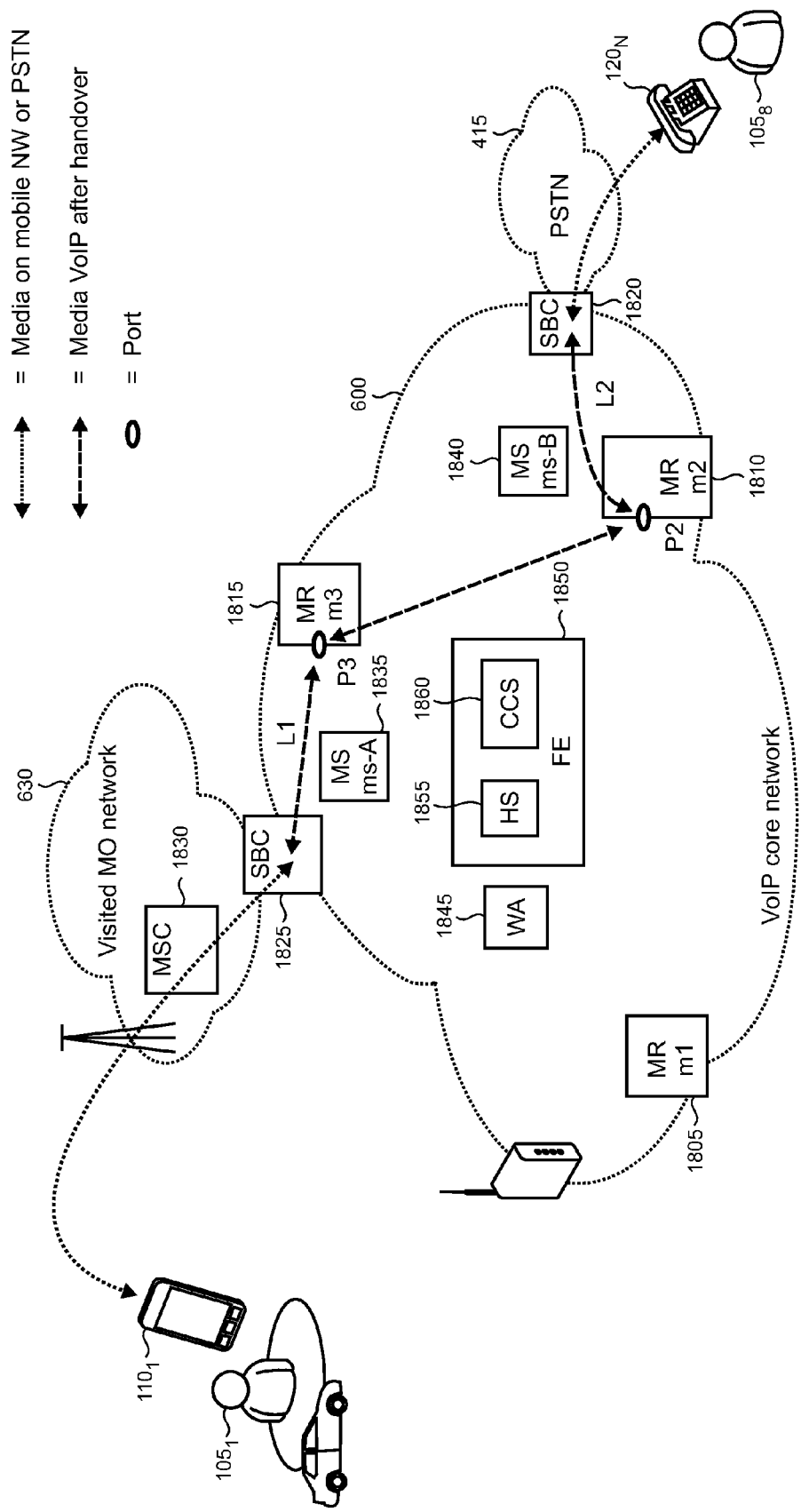
FIG. 20 shows an illustrative final state of a hybrid network topology for a call in which a VCC handoff is completed.

When the newly established CS leg is stable (or the quality of the Wi-Fi connection becomes unacceptable), the VCC client 1720 on the mobile device 110 can disconnect the VoIP/Wi-Fi stream from the user's audio capture-and-render hardware. The old call leg L1 then becomes superfluous and will be torn down. Handoff of the call is now complete as shown in FIG. 20. If at this stage of handoff the Wi-Fi connection fails, the network will typically remove the leg L1 after a suitable guard time interval. Clean-up of the call state will also typically be performed to ensure that it accurately reflects the handoff and the media flow over the new call leg.

While the above illustrative examples describe centralized call routing in the context of a visited MO network, it is emphasized that the present principles described herein may also be applied to other contexts. For example, a mobile device may utilize other types of communications infrastructure to gain access to telephony and data services such as IP-based Wi-Fi and Ethernet networks, white space networks, PSTNs, short-range wireless networks, satellite networks, etc, which are supported by various mobile operators, enterprises, Internet service providers (ISPs), telephone service providers, data service providers, and the like. It will be appreciated that calls using such communications infrastructure may also be routed so that the home network is placed in the call path so that the call can be anchored in the VoIP core network. For example, the CR client and CR service can be adapted to enable a call initiated using Wi-Fi over some IP network to be routed to the VoIP core network 600 (FIG. 6). In this case, the Wi-Fi network and VoIP core network can be completely separate networks and independently operated but centralized call routing may still be utilized with the attendant benefits of call anchoring such as a consistent user experience, improved authorization and fraud management, and enhanced call control features such as call treatments and VCC.

Figure 21:
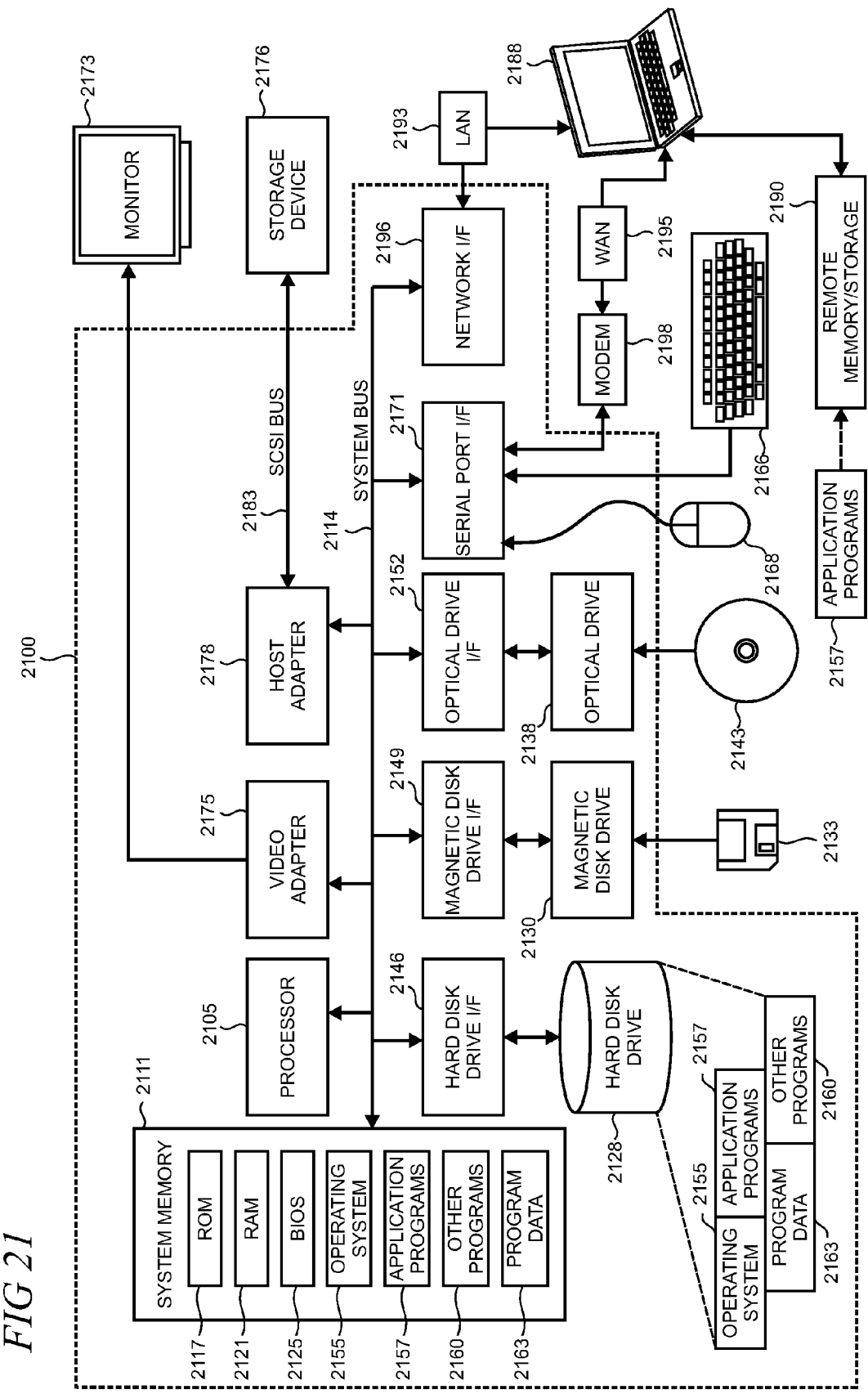
FIG. 21 is a simplified block diagram of an illustrative computer system such as a personal computer (PC) that may be used in part to implement the present centralized routing in hybrid networks.

FIG. 21 is a simplified block diagram of an illustrative computer system 2100 such as a personal computer (PC), client machine, or server with which centralized routing in hybrid networks may be implemented. Computer system 2100 includes a processor 2105, a system memory 2111, and a system bus 2114 that couples various system components including the system memory 2111 to the processor 2105. The system bus 2114 may be any of several types of bus structures including a memory bus or memory controller, a peripheral bus, or a local bus using any of a variety of bus architectures. The system memory 2111 includes read only memory (ROM) 2117 and random access memory (RAM) 2121. A basic input/output system (BIOS) 2125, containing the basic routines that help to transfer information between elements within the computer system 2100, such as during startup, is stored in ROM 2117. The computer system 2100 may further include a hard disk drive 2128 for reading from and writing to an internally disposed hard disk (not shown), a magnetic disk drive 2130 for reading from or writing to a removable magnetic disk 2133 (e.g., a floppy disk), and an optical disk drive 2138 for reading from or writing to a removable optical disk 2143 such as a CD (compact disc), DVD (digital versatile disc), or other optical media. The hard disk drive 2128, magnetic disk drive 2130, and optical disk drive 2138 are connected to the system bus 2114 by a hard disk drive interface 2146, a magnetic disk drive interface 2149, and an optical drive interface 2152, respectively. The drives and their associated computer-readable storage media provide non-volatile storage of computer-readable instructions, data structures, program modules, and other data for the computer system 2100. Although this illustrative example includes a hard disk, a removable magnetic disk 2133, and a removable optical disk 2143, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present centralized routing in hybrid networks. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2133, optical disk 2143, ROM 2117, or RAM 2121, including an operating system 2155, one or more application programs 2157, other program modules 2160, and program data 2163. A user may enter commands and information into the computer system 2100 through input devices such as a keyboard 2166 and pointing device 2168 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 2105 through a serial port interface 2171 that is coupled to the system bus 2114, but may be connected by other interfaces, such as a parallel port, game port, or universal serial bus (USB). A monitor 2173 or other type of display device is also connected to the system bus 2114 via an interface, such as a video adapter 2175. In addition to the monitor 2173, personal computers typically include other peripheral output devices (not shown), such as speakers and printers. The illustrative example shown in FIG. 21 also includes a host adapter 2178, a Small Computer System Interface (SCSI) bus 2183, and an external storage device 2176 connected to the SCSI bus 2183.

The computer system 2100 is operable in a networked environment using logical connections to one or more remote computers, such as a remote computer 2188. The remote computer 2188 may be selected as another personal computer, a server, a router, a network PC, a peer device, or other common network node, and typically includes many or all of the elements described above relative to the computer system 2100, although only a single representative remote memory/storage device 2190 is shown in FIG. 21. The logical connections depicted in FIG. 21 include a local area network (LAN) 2193 and a wide area network (WAN) 2195. Such networking environments are often deployed, for example, in offices, enterprise-wide computer networks, intranets, and the Internet.

When used in a LAN networking environment, the computer system 2100 is connected to the local area network 2193 through a network interface or adapter 2196. When used in a WAN networking environment, the computer system 2100 typically includes a broadband modem 2198, network gateway, or other means for establishing communications over the wide area network 2195, such as the Internet. The broadband modem 2198, which may be internal or external, is connected to the system bus 2114 via a serial port interface 2171. In a networked environment, program modules related to the computer system 2100, or portions thereof, may be stored in the remote memory storage device 2190. It is noted that the network connections shown in FIG. 21 are illustrative and other means of establishing a communications link between the computers may be used depending on the specific requirements of an application of the present centralized routing in hybrid networks.

Figure 22:
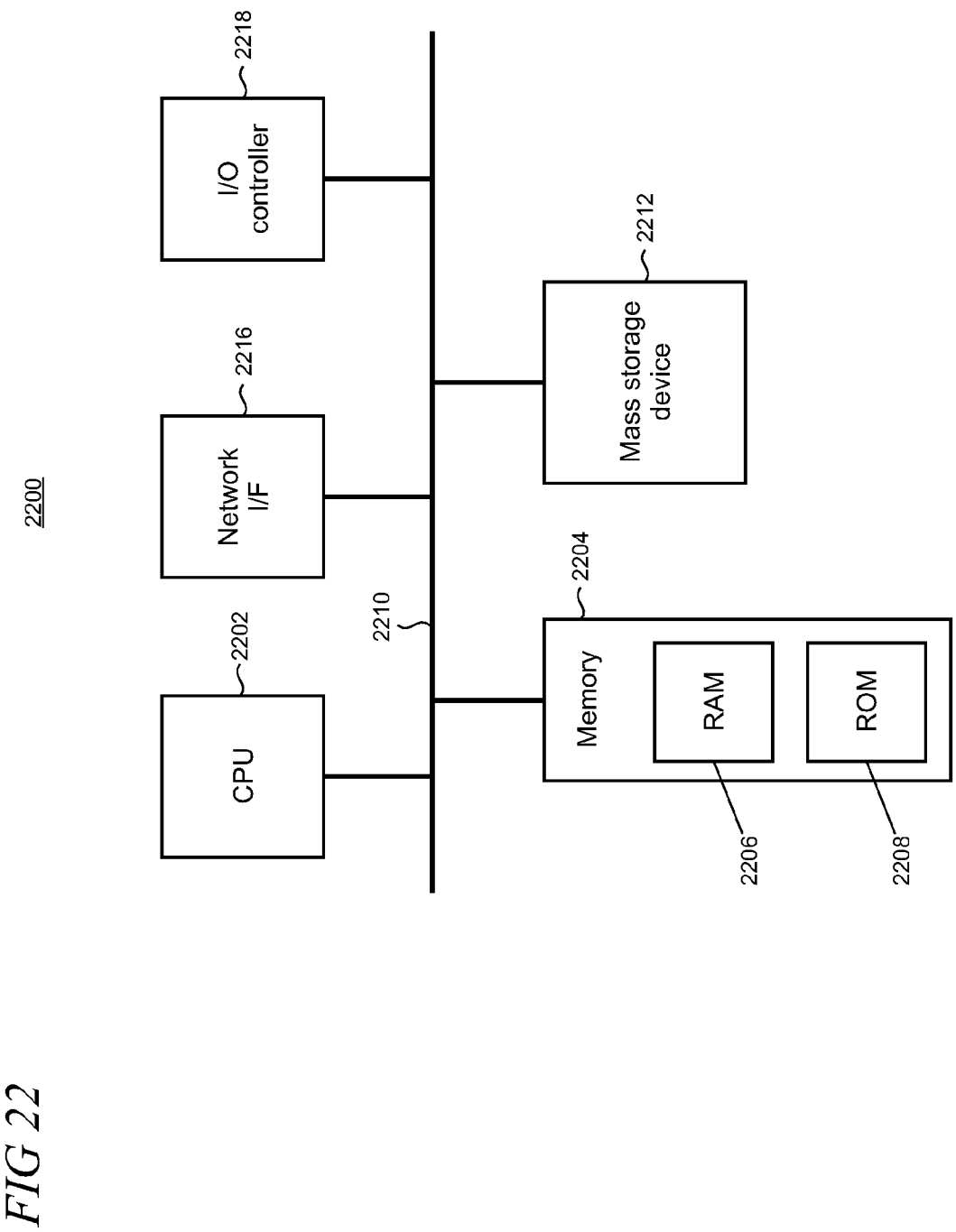
FIG. 22 shows a block diagram of an illustrative device that may be used in part to implement the present centralized routing in hybrid networks.

FIG. 22 shows an illustrative architecture 2200 for a device capable of executing the various components described herein for providing the present centralized routing in hybrid networks. Thus, the architecture 2200 illustrated in FIG. 22 shows an architecture that may be adapted for a server computer, mobile phone, a PDA, a smartphone, a desktop computer, a netbook computer, a tablet computer, GPS device, gaming console, and/or a laptop computer. The architecture 2200 may be utilized to execute any aspect of the components presented herein.

The architecture 2200 illustrated in FIG. 22 includes a CPU (Central Processing Unit) 2202, a system memory 2204, including a RAM 2206 and a ROM 2208, and a system bus 2210 that couples the memory 2204 to the CPU 2202. A basic input/output system containing the basic routines that help to transfer information between elements within the architecture 2200, such as during startup, is stored in the ROM 2208. The architecture 2200 further includes a mass storage device 2212 for storing software code or other computer-executed code that is utilized to implement applications, the file system, and the operating system.

The mass storage device 2212 is connected to the CPU 2202 through a mass storage controller (not shown) connected to the bus 2210. The mass storage device 2212 and its associated computer-readable storage media provide non-volatile storage for the architecture 2200.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2200.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2200.

According to various embodiments, the architecture 2200 may operate in a networked environment using logical connections to remote computers through a network. The architecture 2200 may connect to the network through a network interface unit 2216 connected to the bus 2210. It should be appreciated that the network interface unit 2216 also may be utilized to connect to other types of networks and remote computer systems. The architecture 2200 also may include an input/output controller 2218 for receiving and processing input from a number of other devices, including a keyboard, mouse, or electronic stylus (not shown in FIG. 22). Similarly, the input/output controller 2218 may provide output to a display screen, a printer, or other type of output device (also not shown in FIG. 22).

It should be appreciated that the software components described herein may, when loaded into the CPU 2202 and executed, transform the CPU 2202 and the overall architecture 2200 from a general-purpose computing system into a special-purpose computing system customized to facilitate the functionality presented herein. The CPU 2202 may be constructed from any number of transistors or other discrete circuit elements, which may individually or collectively assume any number of states. More specifically, the CPU 2202 may operate as a finite-state machine, in response to executable instructions contained within the software modules disclosed herein. These computer-executable instructions may transform the CPU 2202 by specifying how the CPU 2202 transitions between states, thereby transforming the transistors or other discrete hardware elements constituting the CPU 2202.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2200 in order to store and execute the software components presented herein. It also should be appreciated that the architecture 2200 may include other types of computing devices, including handheld computers, embedded computer systems, smartphones, PDAs, and other types of computing devices known to those skilled in the art. It is also contemplated that the architecture 2200 may not include all of the components shown in FIG. 22, may include other components that are not explicitly shown in FIG. 22, or may utilize an architecture completely different from that shown in FIG. 22.

Figure 23:
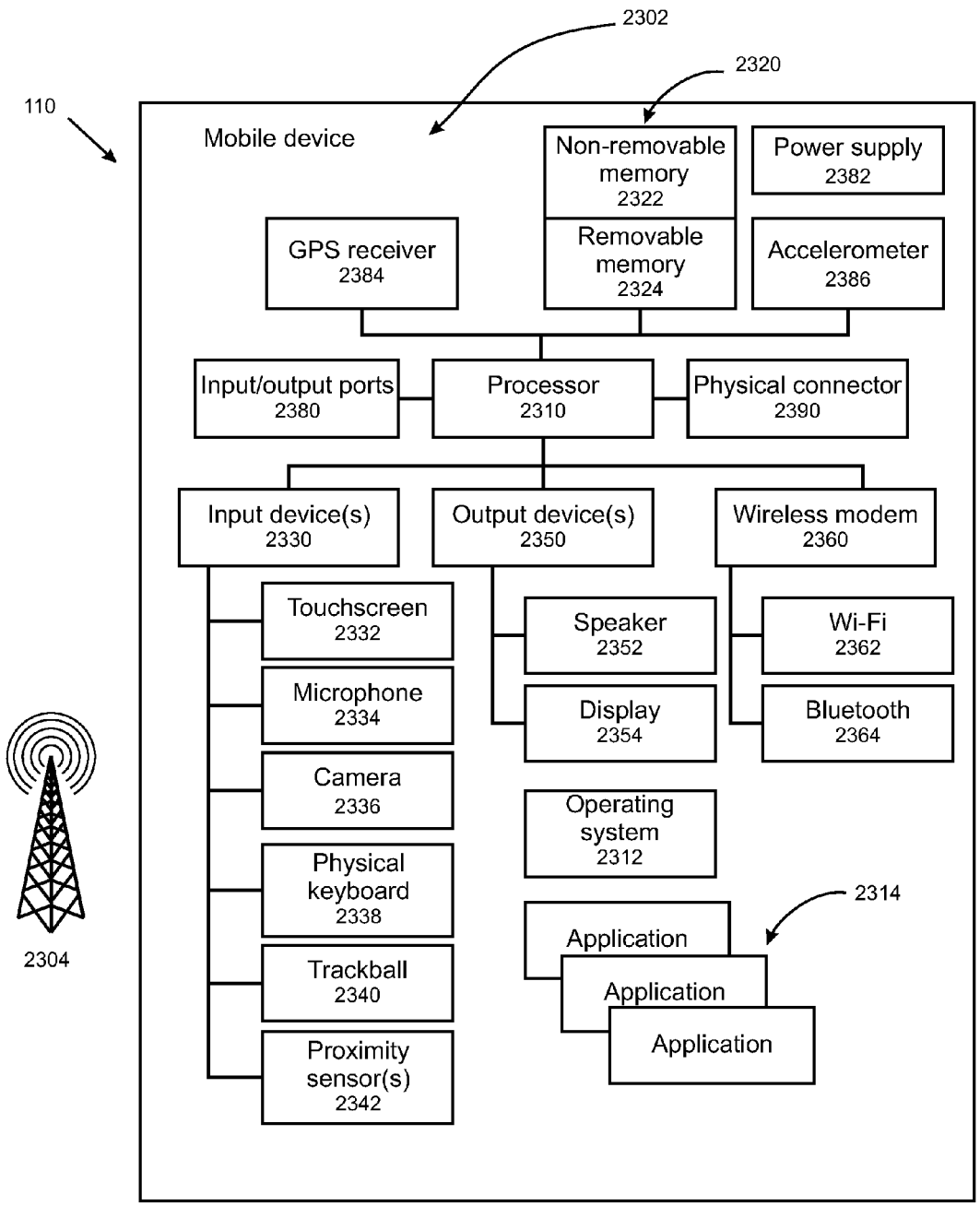
FIG. 23 is a block diagram of an illustrative mobile device.

FIG. 23 is a functional block diagram of an illustrative mobile device 110 such as a mobile phone or smartphone including a variety of optional hardware and software components, shown generally at 2302. Any component 2302 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2304, such as a cellular or satellite network.

The illustrated mobile device 110 can include a controller or processor 2310 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2312 can control the allocation and usage of the components 2302, including power states, above-lock states, and below-lock states, and provides support for one or more application programs 2314. The application programs can include common mobile computing applications (e.g., image-capture applications, email applications, calendars, contact managers, web browsers, messaging applications), or any other computing application.

The illustrated mobile device 110 can include memory 2320. Memory 2320 can include non-removable memory 2322 and/or removable memory 2324. The non-removable memory 2322 can include RAM, ROM, Flash memory, a hard disk, or other well-known memory storage technologies. The removable memory 2324 can include Flash memory or a Subscriber Identity Module (SIM) card, which is well known in GSM (Global System for Mobile communications) systems, or other well-known memory storage technologies, such as "smart cards." The memory 2320 can be used for storing data and/or code for running the operating system 2312 and the application programs 2314. Example data can include web pages, text, images, sound files, video data, or other data sets to be sent to and/or received from one or more network servers or other devices via one or more wired or wireless networks.

The memory 2320 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 2320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 2330; such as a touch screen 2332; microphone 2334 for implementation of voice input for voice recognition, voice commands and the like; camera 2336; physical keyboard 2338; trackball 2340; and/or proximity sensor 2342; and one or more output devices 2350, such as a speaker 2352 and one or more displays 2354. Other input devices (not shown) using gesture recognition may also be utilized in some cases. Other possible output devices (not shown) can include piezoelectric or haptic output devices. Some devices can serve more than one input/output function. For example, touchscreen 2332 and display 2354 can be combined into a single input/output device.

A wireless modem 2360 can be coupled to an antenna (not shown) and can support two-way communications between the processor 2310 and external devices, as is well understood in the art. The modem 2360 is shown generically and can include a cellular modem for communicating with the mobile communication network 2304 and/or other radio-based modems (e.g., Bluetooth 2364 or Wi-Fi 2362). The wireless modem 2360 is typically configured for communication with one or more cellular networks, such as a GSM network for data and voice communications within a single cellular network, between cellular networks, or between the mobile device and a public switched telephone network (PSTN).

The mobile device can further include at least one input/output port 2380, a power supply 2382, a satellite navigation system receiver 2384, such as a GPS receiver, an accelerometer 2386, a gyroscope (not shown), and/or a physical connector 2390, which can be a USB port, IEEE 1394 (FireWire) port, and/or an RS-232 port. The illustrated components 2302 are not required or all-inclusive, as any components can be deleted and other components can be added.

Based on the foregoing, it should be appreciated that technologies for centralized routing in hybrid networks have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed by a mobile device having telephony capabilities, comprising:
   receiving an input that indicates a destination number for an outbound call to a remote party;
   placing a make-call request to a home network;
   receiving a roaming routing number (RRN) from the home network in response to the make-call request;
   calling into the roaming routing number (RRN) over a mobile operator (MO) network, the roaming routing number being terminated within a home network that is a portion of a hybrid network, the hybrid network having loosely coupled network portions including one or more MO networks and the home network; and
   sending a dialing string to the home network that includes the destination number, the home network responsively placing a call to the destination number and bridging the call from the mobile device and the call to the destination number to create an end-to-end call path between the mobile device and remote party to thereby anchor media, signaling, and context associated with the call in the home network,
   wherein the dialing string includes an encoded portion, the encoded portion being calculated using the destination number and a PIN (personal identification number), the PIN being commonly shared by the mobile device and the home network.

2. The method of claim 1 further comprising including a source number associated with the mobile device in the dialing string.

3. The method of claim 1, wherein the encoded portion is created using either a hashing algorithm or a Luhn checksum algorithm.

4. The method of claim 3 further comprising including a source number associated with the mobile device in the encoded portion.

5. The method of claim 1 further comprising calling into the RRN over a circuit-switched voice connection supported by the MO network and sending the dialing string using audio encoding.

6. The method of claim 5 further comprising performing the audio encoding using one of DTMF (Dual Tone, Multiple Frequency) or TDD/TTY (Telecommunications Device for the Deaf/Teletypewriter).

7. The method of claim 1 further comprising pausing between calling into the RRN and sending the dialing string, a pause length being variable and selected according to a rule, heuristic, or policy.

8. The method of claim 1 further comprising receiving a signal from the home network that indicates that the home network is ready to receive the dialing string.

9. The method of claim 1 further comprising either accessing the RRN as a pre-provisioned resource or obtaining the RRN from the home network over a data connection supported by the MO network.

10. The method of claim 1 further comprising sending the dialing string in accordance with USSD (Unstructured Supplementary Service Data) under GSM (Global System for Mobile communications).

11. A mobile device, comprising:
    one or more processors; and
    memory operatively coupled to the one or more processors and storing computer-readable instructions that, when executed by the one or more processors, perform a method comprising the steps of:
      receiving an input from a user of the mobile device that indicates a destination number for an outbound call to a remote device,
      inserting the destination number in a dialing string, wherein the dialing string includes an encoded portion, the encoded portion being calculated using the destination number and a PIN (personal identification number), the PIN being commonly shared by the mobile device and a home network,
      placing a make-call request to a centralized routing (CR) service exposed by the home network, the home network being a portion of a hybrid network that includes one or more mobile operator (MO) networks, the make-call request being transmitted over a cellular data connection supported by an MO network,
      receiving a roaming routing number (RRN) from the CR service over the cellular data connection in response to the make-call request, the RRN terminating in the home network,
      placing a call into the RRN over a cellular voice connection supported by the MO network, and
      sending the dialing string to the CR service over the cellular voice call to the RRN using audio encoding.

12. The mobile device of claim 11 further comprising playing audio including one of white noise, voice, audio tones, or comfort sounds on an audio endpoint associated with the mobile device during at least a portion of a time that an end-to-end call path between the mobile device and remote device is being set up.

13. The mobile device of claim 11 in which the CR service, in response to the receipt of the dialing string responsively places a call to the destination number and bridges cellular voice call and the call to the destination number to create an end-to-end call path between the mobile device at a local end and remote party at a far end, the method further comprising receiving a signal from the CR service that indicates ringing or busy at the far end and playing an audio ringtone or busy signal on an audio endpoint associated with the mobile device in response to the received signal.

14. One or more computer-readable memories storing instruction which, when executed by one or more processors disposed in an electronic device, implement a centralized routing (CR) service exposed by a home network in a hybrid network, the CR service performing a method comprising:
  receiving a make-call request from a CR client instantiated on a mobile device, the make-call request including a source number associated with the mobile device, the make-call request being transported over a cellular data connection provided by a visited mobile operator (MO) network;
  calling the mobile device using the source number over a cellular calling connection provided the visited mobile operator network;
  receiving a destination number for a remote party from the CR client in a dialing string, at least a portion of the dialing string being encoded using a PIN (personal identification number), the PIN being commonly shared by the CR client and CR service, and further verifying the integrity of the destination number using the encoded portion of the dialing string;
  calling the remote party using the destination number;
  bridging the call to the mobile device and the call to the remote party;
  implementing one or more call control features for the bridged call, the call control features including one of voice call continuity or mid-call treatments.

15. The one or more computer-readable memories of claim 14 further comprising creating an end-to-end call path between local and far ends of the bridged call, the end-to-end call path traversing the home network.

16. The one or more computer-readable memories of claim 14 further comprising authenticating an identity of a calling party using the encoded portion of the dialing string.

17. The one or more computer-readable memories of claim 16 further comprising receiving the dialing string over one of the cellular calling connection or the cellular data connection.

18. The one or more computer-readable memories of claim 16 further comprising sending a signal to the CR client to indicate that the CR service is ready to receive the dialing string.

19. The one or more computer-readable memories of claim 14 further comprising collecting connection statistics from users associated with the home network, developing connection policies using the collected connection statistics, and sending the connection policies to the mobile device, the connection policies governing at least portions of operations of the CR client.

20. The one or more computer-readable memories of claim 18 further comprising developing the connection policies to control CR client operations including at least one of how to generate the dialing string, how to transmit the dialing string, or when to transmit the dialing string.

* * * * *